(12) United States Patent
Beaumont et al.

(10) Patent No.: US 8,572,403 B2
(45) Date of Patent: Oct. 29, 2013

(54) DIGITAL VIDEO GUARD

(75) Inventors: Mark Robert Grant Beaumont, Edinburgh (AU); Christopher James Guildford North, Edinburgh (AU); Kenneth Kwok-Hei Yiu, Edinburgh (AU); Joshua David Green, Edinburgh (AU)

(73) Assignee: The Commonwealth of Australia, Edinburgh (AT)

( * ) Notice: Subject to any disclaimer, the term of this patent is extended or adjusted under 35 U.S.C. 154(b) by 0 days.

(21) Appl. No.: 13/126,444

(22) PCT Filed: Dec. 24, 2009

(86) PCT No.: PCT/AU2009/001706
§ 371 (c)(1),
(2), (4) Date: Jul. 12, 2011

(87) PCT Pub. No.: WO2010/071947
PCT Pub. Date: Jul. 1, 2010

(65) Prior Publication Data
US 2011/0264922 A1   Oct. 27, 2011

(30) Foreign Application Priority Data

Dec. 24, 2008   (AU) ................................ 2008906649

(51) Int. Cl.
*G06F 11/30* (2006.01)
(52) U.S. Cl.
USPC ............................................ 713/189; 726/22
(58) Field of Classification Search
None
See application file for complete search history.

(56) References Cited

U.S. PATENT DOCUMENTS

| 5,822,435 A | * | 10/1998 | Boebert et al. | 713/192 |
| 5,949,877 A | | 9/1999 | Traw et al. | |
| 6,064,739 A | * | 5/2000 | Davis | 380/200 |

(Continued)

FOREIGN PATENT DOCUMENTS

WO       WO 97/35431 A1    9/1997

OTHER PUBLICATIONS

Nevis Networks, An Architectural View of LAN Security: In-Band versus Out-of-Band Solutions, 2007, pp. 1-16; http://www.nevisnetworks.com/content/white_papers/In-band%20vs%20/02Out-of-band.pdf.*

(Continued)

*Primary Examiner* — Jeffrey Pwu
*Assistant Examiner* — Carlos Amorin
(74) *Attorney, Agent, or Firm* — Knobbe Martens Olson & Bear LLP

(57) ABSTRACT

This invention relates to the veracity of information displayed to a user of a computer, and information provided to a computer by human input devices such as mice and keyboards. A digital video guard (DVG) device is a peripheral that is retrofitted to commodity computer devices. The DVG resides in-line with a digital display and enables secure end-to-end interactions between a user and a displayed (usually remote) application. In-band signalling within the digital video stream is used to carry encrypted information from a local or remote source, over untrusted network infrastructure through the digital video guard device to a user. The DVG decrypts and verifies the integrity of the digital video. The integrity of the displayed information is indicated by a trusted LED on the DVG hardware. Portions of the video signal may be designated as trusted, if the received data has been encrypted, signed, or labelled as trustworthy.

23 Claims, 23 Drawing Sheets

(56) References Cited

U.S. PATENT DOCUMENTS

| | | | | |
|---|---|---|---|---|
| 7,075,899 | B2* | 7/2006 | Sheehan et al. | 370/257 |
| 7,581,097 | B2* | 8/2009 | Catherman et al. | 713/168 |
| 7,734,933 | B1* | 6/2010 | Marek et al. | 713/193 |
| 2002/0012432 | A1* | 1/2002 | England et al. | 380/231 |
| 2003/0028664 | A1* | 2/2003 | Tan et al. | 709/237 |
| 2003/0226029 | A1* | 12/2003 | Porter et al. | 713/200 |
| 2004/0111631 | A1* | 6/2004 | Kocher et al. | 713/194 |
| 2004/0250087 | A1* | 12/2004 | Ray et al. | 713/189 |
| 2005/0010790 | A1* | 1/2005 | Lang et al. | 713/193 |
| 2005/0108540 | A1* | 5/2005 | Kusnoto et al. | 713/176 |
| 2005/0172134 | A1* | 8/2005 | Thornton et al. | 713/182 |
| 2005/0188224 | A1* | 8/2005 | Betts-LaCroix | 713/201 |
| 2005/0278787 | A1* | 12/2005 | Naslund et al. | 726/26 |
| 2006/0123249 | A1* | 6/2006 | Maheshwari et al. | 713/193 |
| 2007/0115889 | A1* | 5/2007 | Song et al. | 370/331 |
| 2007/0160151 | A1* | 7/2007 | Bolton et al. | 375/240.25 |
| 2007/0256126 | A1* | 11/2007 | Erickson et al. | 726/20 |
| 2008/0022128 | A1* | 1/2008 | Proudler et al. | 713/189 |
| 2008/0095366 | A1 | 4/2008 | Taniguchi | |
| 2008/0189554 | A1* | 8/2008 | Ali et al. | 713/189 |
| 2008/0316357 | A1* | 12/2008 | Achari et al. | 348/564 |
| 2009/0055930 | A1* | 2/2009 | Peles | 726/23 |
| 2009/0141894 | A1* | 6/2009 | Sahdra et al. | 380/239 |
| 2009/0245520 | A1* | 10/2009 | Chang et al. | 380/279 |
| 2010/0005500 | A1* | 1/2010 | Cloonan et al. | 725/110 |
| 2010/0042855 | A1* | 2/2010 | Karam | 713/310 |
| 2010/0071071 | A1* | 3/2010 | Boic | 726/26 |
| 2010/0153743 | A1* | 6/2010 | Cho et al. | 713/189 |
| 2010/0161975 | A1* | 6/2010 | Ducharme et al. | 713/164 |
| 2010/0186087 | A1* | 7/2010 | Bolton et al. | 726/22 |
| 2011/0060921 | A1* | 3/2011 | Michael | 713/192 |
| 2012/0166816 | A1* | 6/2012 | Evans et al. | 713/189 |
| 2012/0266000 | A1* | 10/2012 | Maheshwari et al. | 713/189 |

OTHER PUBLICATIONS

Sammo Cho, et al., System and Services of Terrestrial Digital Multimedia Broadcasting (T-DMB), IEEE Transactions on Broadcasting, vol. 53, No. 1, Mar. 2007, pp. 171-178.*

The International Search Report and Written Opinion of the International Searching Authority mailed on Feb. 8, 2010 for PCT/AU2009/001706 filed Dec. 24, 2009 (in 15 pages).

MPEG Program Stream {retrieved on Apr. 26, 2011}. Retrieved from Internet http://en.wikipedia.org/w/index.php?title=MPEG_program_stream&oldid=327883173 Published on Nov. 25, 2009 as per History page on Wikipedia (in 3 pages).

DVB-T {retrieved on Apr. 26, 2011}. Retrieved from Internet http://en.wikipedia.org/w/index.php?title=DVB-T&oldid=333378800 Published on Dec. 22, 2009 as per the History page on Wikipedia (in 8 pages).

* cited by examiner

DIGITAL VIDEO GUARD

FIELD OF INVENTION

This application is a national phase application of International Application No. PCT/AU2009/001706, filed Dec. 24, 2009, which claims priority to Australian Application No. 2008906649, filed Dec. 24, 2008, which are both incorporated by reference herein in their entirety.

BACKGROUND

Our interactions with computers and hence the Internet rely heavily on a computer's input and output devices, namely the keyboard, mouse and display. A majority of these interactions are driven by the information that is presented to a user on the display. The content and source of this information is usually processed and taken for granted by a user, increasingly leading to phishing, spoofing, virtualisation, and other visually-based attacks. These attacks are successful because the information displayed to the user is what they expect to see. As attackers become savvier, users will find it increasingly difficult to determine the integrity of visual information presented to them.

Not only is it difficult for the user to determine the integrity of the presented information but it is also becoming increasingly difficult for users to guarantee the integrity of their computer systems. Consequently they can have little confidence in the confidentiality of their data, particularly when using remote inter-networked applications such as web banking. Malware can attack operating systems leaking sensitive, private information over the network. Malicious software hooks can be installed which copy keyboard and mouse events, capture the screen buffer, insert and modify network traffic and otherwise interpose on a user's interactions with the computer. Hostile websites or cross-site scripting attacks target web-based applications, enabling full exploitation of the client or other attacks designed to fool users into revealing sensitive information. These are only a few of the mechanisms available to the attacker. To mitigate such risks, a knowledgeable user needs to ensure that their operating system and applications are regularly patched, maintain well configured personal firewall and anti-spyware protective measures, and employ 'safe browsing practices'. Even with all these measures the user remains reliant on the integrity and timeliness of the automated patch process, for both the operating system and applications, and the integrity of their hardware. The use of machines of unknown integrity specifically precludes any form of trust—most Commercial Off The Shelf (COTS) equipment falls into this category.

The specification uses the terms trusted and untrusted which can have specific meanings to those skilled in the art of computer security. The use of these terms herein are not limited to those special meanings in certain contexts where their meaning may include trustworthy and untrustworthy which can be understood to mean that the level of trust is relative to the circumstances and the risks associated therewith, as such there can be a single level or multiple levels of trust in not only the hardware but also the software used to implement one or more of the embodiments of the invention as well as data received and sent in whatever format that may be. The above discussion of the concept of trust also assumes absolute trust in the human user of the relevant software and hardware.

In the context of this invention depending upon circumstances of use, a user needs to trust the invention to perform certain operations in a manner resistant to tamper or malicious modification. This level of resistance is dependent on the circumstances of use and varying mechanisms have been employed to provide the requisite level of trust. Further mechanisms to provide physical, communications and computer security are known to those skilled in the art. The invention can be used with untrusted infrastructure, where it can be assumed that any possible malicious modification that can be made to a system has occurred and no trust can be placed in any actions of the system.

Extant and proposed work on ensuring the veracity of displayed information and input devices has focused on trusted systems, trusted displays, and securing content and delivery. Significantly this invention utilises existing communication channels and computing infrastructure such as the untrusted digital communications networks with a novel in-band addition to achieve requisite functionality and trust.

Trusted Systems

Much work has been done on securing computing systems and applications, with high grade systems almost universally requiring a Trusted Computing Base utilising trusted paths for the input and output. Boebert WO94/01821 proposed trusted paths for the keyboard and display, with a Trusted Path Subsystem providing encryption of keyboard input and generation of video output from received encrypted video packets. This system utilised an out-of-band mechanism for delivery of the trusted content and input redirection, and required the trusted content be stored within the device before video generation.

Trusted Displays

Existing trusted displays are generally integrated with a trusted computing platform and form an integral part of a complete trusted system, relying on tamper resistance and tight hardware integration to provide integrity of displayed information. Trusted Display Processors have been proposed, that can display a bitmap image in a trusted fashion. A typically proposed module utilises a smart card to provide cryptographic support and would be able to check the signature on a bitmap image that is sent to the module. The bitmap image is then displayed and an indication of trust given; one proposed method of indicating trust was to utilise a unique watermark displayed to the user Extant and proposed solutions seek to provide a trusted manner in which to view and hence verify a digital document residing on a local machine. The Trusted Display Processors do not propose real-time operation and are not manipulating digital video streams. The applications presented were for local verification of local bitmap images.

Content Protection

HDCP is a point-to-point protocol (not end-to-end) which is used to secure the entire content of a digital video stream as it travels from a transmitter (DVD player, PC, etc.) to a receiver (digital display). The idea is to protect the content that will be streamed across the link—i.e. prevent the digital stream from being 'ripped' to another media. A transmitter encrypts every pixel sent to the receiver and the receiver is able to decrypt the stream before displaying it. HDCP command and control is performed out of band through a secondary ($I^2$ C) link between the transmitter and receiver. The transmitters and receivers are keyed at manufacture and can negotiate a mutual key for the link encryption. HDCP protected media can only be played with an HDCP transmitter and corresponding receiver.

Secure Application Delivery

Remote desktop applications exist for most platforms and allow a user to access a remote server over a network connection. These applications differ in their level of integration with the operating system, their authentication mechanisms, and their network security schemes.

Significantly, no existing application architecture takes into account the trust state of a user's computer (either software or hardware), allowing the integrity and privacy of any action performed by the user on that computer, including for example a remote session, to be compromised by an attacker with control of the user's computer. The invention described herein extends the trust boundary to the computer's display and peripherals and bypasses such an attacker.

BRIEF DESCRIPTION OF THE INVENTION

In a broad aspect of the invention a trusted digital video guard for controlling the display of trustworthy and untrustworthy data on a digital video display device, includes:
 a. a digital video data input for receiving untrustworthy digital data and in-band trustworthy digital data;
 b. a trusted digital video output for outputting digital video to the video display device;
 c. at least one trusted status indicator having a trusted indicator state and an untrusted indicator state; and
 d. a trusted digital processor operatively connected to the digital video data input, trusted digital video output and trusted status indicator, and which processes in-band digital data to identify trustworthy and untrustworthy digital data and for directing,
  i. untrustworthy digital data to the trusted digital video output; and/or
  ii. trustworthy digital data to the trusted digital video output, and controlling the status of the trusted status indicator to the trusted indicator state.

In another aspect of the invention of the trusted digital video guard wherein while trustworthy video is output to the video display device untrustworthy video is displayed in an undecipherable/unreadable/unintelligible/scrambled/unviewable (because the unprocessed digital video data is merely encapsulated or encrypted digital video data) or otherwise modified state (including being consumed by the DVG—meaning that the digital video data is deleted or otherwise not communicated external of the device) and provided to the trusted digital video output.

Optionally, the DVG can include the following capability to increase its functionality:
 a. a Universal Serial Bus (USB) hub for receiving and transmitting USB traffic;
 b. a means for encrypting, decrypting, compressing and decompressing data; and
 c. a network connection port for receiving and transmitting network communications.

The DVG is a device that is fitted inline or can be retrofitted to a computer device for example a commodity PCs. The use of a DVG can provide trust in specific information presented on a digital display associated with the computer device. In an embodiment the DVG resides in-line with a digital display and enables secure end-to-end interactions between a user and a displayed (usually remotely sourced) application. In-band signalling within the digital video stream is used to carry encrypted/signed information from a remote source, over untrusted network infrastructure through the DVG to a user for viewing. The creation of encrypted/signed digital video content can be achieved by either local or remote applications, and is effected by manipulating what is to be rendered on a computer's display, i.e. encrypting data that will at some time form part of a digital display stream and be output from a computer device to a digital display. The DVG can decrypt and verify the integrity of the digital video content as it is sent to a digital display. The integrity of the displayed information is indicated by a trusted indicator such as a Light Emitting Diode (LED) on the DVG hardware. Part or the entire video signal may be designated as trusted, this is implicit, depending on what data within the video signal has been encrypted, signed, or otherwise labelled as being trustworthy. Displaying encrypted video content without using the DVG, either on a digital or analogue display, will result in the encrypted (trusted) portion of the video signal rendering as random pixel data. The DVG may also be used with cryptographically signed video content, in which case the content will display on any display device, but the DVG will be able to guarantee and indicate the integrity of the content. Although the DVG can indicate trust in the video content being rendered, the digital display is still required to be trusted for a user to be able to trust the information being presented recognising that the interaction a user has with a display is generated by a human to computer interface device, examples being user peripherals such as pointers and keyboards. In an embodiment of the DVG presented in this specification secure keyboard and pointer input is provided full bi-directional end-to-end security The Digital Visual Interface (DVI) specification defines a digital interface for transmission of digital display data between a source and a display device. The specification is device independent and defines signalling and protocols to keep display data in digital form from "creation to consumption". At the physical layer the digital data is transmitted using Transmission Minimised Differential Signalling (TMDS). In one embodiment of the DVG it is this TMDS digital stream that the DVG intercepts, decodes, and then regenerates to provide the trusted display functionality although any digital display data stream could be used as a source.

The DVG is an in-band, real-time approach and provides a lightweight and portable solution to trusted application delivery. Components of other relevant elements are further discussed in the specification.

The DVG operates in real-time on a digital video stream with a standard, (COTS) PC and DVI display. The DVG takes advantage of in-band signalling and the robustness of any suitable digital video stream including in particular the TMDS stream to provide a simple in-line path for decryption and consequent display of trusted images. The DVG can also leverage the increasing bandwidth of computer networks to implement viable remote applications.

DVG is not tied to a particular piece of equipment and encryption is applied end-to-end, unlike HDCP protocol protected video streams.

The Digital Video Encryptor (DVE) complements the DVG being a security device (not unlike a peripheral) that can be plugged into the digital video port of a trusted server or remote computer, from which the user requires content suitable for viewing utilising the DVG. The DVE intercepts the digital video data signal, encapsulates the content within a specified file format (typically an image file) and may encrypt the encapsulated digital video and outputs the encrypted digital video over a network interface.

In a further aspect of the invention a trusted digital guard for transferring trusted digital data from a trusted server which serves digital video data over an un-trusted digital data network, includes
 a. a digital video data input for receiving untrustworthy digital data and in-band trustworthy digital data from the un-trusted digital data network;
 b. at least one peripheral interconnect output for outputting trustworthy digital data;

c. a trusted digital processor operatively connected to the digital video data input and at least one peripheral interconnect output which processes in-band trustworthy digital data and for directing trustworthy digital data to the at least one peripheral interconnect output.

In a yet further aspect of the invention a digital data security system for delivery over an untrusted digital data network, of trusted video data from a trusted server to a video display device associated with a computer device, includes
 a digital video device operatively connected to the trusted server includes a digital processor for receiving trusted video content from the trusted server, encapsulating the trusted video data with a predetermined file format, transferring the encapsulated trusted video content over the untrusted digital network to the computer device associated with the video display device, and
 a digital video guard for controlling display of trustworthy and untrustworthy data on a digital video display device includes,
  a. digital video data input for receiving untrustworthy digital data and in-band trustworthy digital data from the computer device associated with the video display device;
  b. a trusted digital video output for outputting digital video to video display device;
  c. a trusted status indicator having a trusted indicator state and an untrusted indicator state; and
  d. a trusted digital processor operatively connected to the digital data input, trusted digital video output and trusted status indicator, and which processes in-band digital data to identify trustworthy and untrustworthy digital data and for directing,
   i. untrustworthy digital data after processing to the trusted digital video output; and/or
   ii. trustworthy digital data after processing to the trusted digital video output, and controlling the status of the trusted status indicator to the trusted indicator state.

A Digital Data Guard (DDG) can be used to provide a facility for securely transferring content from a trusted content server across an untrusted network and via the use of an untrusted computer onto a user's peripheral data storage device such as a USB data storage device.

In an aspect of the invention a trusted digital data guard for connection to a source of encapsulated digital video data including within the encapsulated digital video data trustworthy data, and a peripheral data storage device, includes:
 a. a digital video data input for receiving encapsulated digital video data,
 b. at least one trusted peripheral interconnect output,
 c. a trusted digital processor operatively connected to the digital video data input and at least one peripheral interconnect output for un-encapsulating the digital video data to extract the trustworthy data and provide the trustworthy data to the peripheral device associated with the at least one peripheral interconnect output.

In an aspect of the invention a trusted digital data guarding method for controlling the display of trustworthy and untrustworthy data on a digital video display device, includes the steps of:
 a. receiving at digital video data input untrustworthy digital data and in-band trustworthy digital data;
 b. outputting at trusted digital video output digital video data to the video display device;
 c. processing with a trusted digital processor operatively connected to the digital video data input, trusted digital video output and trusted status indicator, to processes in-band digital data to identify trustworthy and untrustworthy digital data and for directing,
  i. untrustworthy digital data to the trusted digital video output; and/or
  ii. trustworthy digital data to the trusted digital video output, and controlling the status of one of at least one trusted status indicator to the trusted indicator state.

In another aspect of the digital data security method for delivery over an untrusted digital data network, of trusted video data from a trusted server to a video display device associated with a computer device, includes the steps of;
 a. processing in a digital video device operatively connected to the trusted server to receive trusted video content from the trusted server,
 b. encapsulating the trusted video data with a predetermined file format,
 c. transferring the encapsulated trusted video content over the untrusted digital network to the computer device associated with the video display device, and
 d. processing in a digital video guard for controlling display of trustworthy and untrustworthy data on a digital video display device including the steps of
 e. receiving at digital video data input untrustworthy digital data and in-band trustworthy digital data;
 f. processing with a trusted digital processor operatively connected to the digital video data input, trusted digital video output and trusted status indicator, to processes in-band digital data to identify trustworthy and untrustworthy digital data and for directing,
  i. untrustworthy digital data to the trusted digital video output; and/or
  ii. trustworthy digital data to the trusted digital video output, and controlling the status of one of at least one trusted status indicator to the trusted indicator state; and
 g. outputting at a trusted digital video output digital video data to the video display device.

In yet a further aspect of the invention a trusted digital video communication method for operatively connecting a trusted server which serves trusted digital video data over an un-trusted digital network, includes the steps of;
 a. receiving at a digital video data input trusted digital video data from the trusted server;
 b. outputting at a digital communications port data to the untrusted digital network;
 c. processing with a trusted digital processor operatively connected to the digital video data input and digital communications port, to encapsulate the trusted digital video data with a predefined file format and outputting the encapsulated trusted digital video data from the digital communications port over the un-trusted digital network.

In yet another aspect of the invention a trusted digital data guarding method for connecting a source of encapsulated digital video data including within the encapsulated digital video data trustworthy data to a peripheral data storage device, includes the steps of
 a. receiving on a digital video data input encapsulated digital video data;
 b. outputting data from at least one trusted peripheral interconnect output;
 c. processing with a trusted digital processor operatively connected to the digital video data input and at least one peripheral interconnect output, to un-encapsulating the digital video data to extract the trustworthy data and provide the trustworthy data to the peripheral device associated with the at least one peripheral interconnect output.

A detailed description of one or more preferred embodiments of the invention is provided below along with accompanying figures that illustrate by way of example the principles of the invention. While the invention is described in connection with such embodiments, it should be understood that the invention is not limited to any embodiment. On the contrary, the scope of the invention encompasses numerous alternatives, modifications, and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

Throughout this specification and the claims that follow unless the context requires otherwise, the words 'comprise' and 'include' and variations such as 'comprising' and 'including' will be understood to imply the inclusion of a stated integer or group of integers but not the exclusion of any other integer or group of integers.

The reference to any prior art in this specification is not, and should not be taken as, an acknowledgment or any form of suggestion that such prior art forms part of the common general knowledge.

Logic and/or digital processing as well as digital inputs, digital outputs and digital processors as used here in, includes but is not limited to hardware, firmware, software and/or combinations of each to perform a function(s) or an action(s), and/or to cause a function or action from another component. For example, based on a desired application or needs, logic may include a software controlled microprocessor, discrete logic such as an application specific integrated circuit (ASIC), or other programs and logic devices. Logic may also be fully embodied as software.

"Software," as used here in, includes but is not limited to 1 or more computer readable and/or executable instructions that cause a computer or other electronic device to perform functions actions, and/or behave in a desired manner. The instructions may be embodied in various forms such as routines, algorithms, modules, or programs including separate applications or code from dynamically linked libraries. Software may also be implemented in various forms such as a stand-alone program, a function call, a servlet, an applet, instructions stored in a memory, part of an operating system or other type of executable instructions.

It will be appreciated by one of ordinary skilled in the art that the form of software is dependent on, for example, requirements of a desired application, the environment it runs on, and/or the desires of a designer/programmer or the like.

DETAILED DESCRIPTION OF EMBODIMENTS OF THE INVENTION

Figure 1:
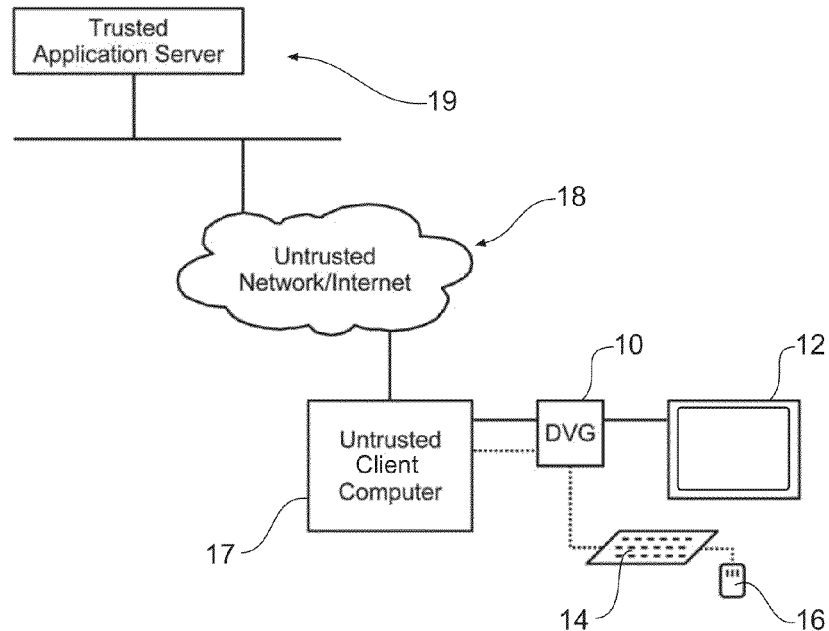
FIG. 1 depicts an in-line DVG arrangement, operating in conjunction with untrusted infrastructure.

The DVG is simple to retrofit between various display and computer devices, includes minimal electronics and complexity, and yet is able to use the advantages of untrusted infrastructure to support delivery of secure, high trust services and content.

Once the DVG is in place its function will be transparent to the user. In the case of a user wishing to, by way of example, interact with a bank to conduct a banking transaction, access as is typically achieved via the worldwide collection of computers and computer networks referred to as the Internet, and that access is achieved by use of the users browser connecting to a predetermined URL (webpage address) for the bank. One or more 1st level security procedures may be required, such as a login and password, and the use of other more stringent security procedures can be required to allow the user access to their account. However, unless an appropriate DVG is in place any data destined to be displayed to the user will not display in an intelligible form. The DVG will decrypt the encoded data destined to be displayed to the user and provide the data, within a predetermined area of the display connected to the monitor/display output of the DVG and simultaneously provide an indication visible (lighting a lamp or LED) and/or audible to show that what is displayed has veracity as being from the expected source.

The exact digital data content that is protected in this manner is determined by the application at hand. Specific embodiments of this invention as detailed herein leverage this secure content delivery in different manners, appropriate to their cause.

As well as the unidirectional digital content protection provided from remote source through the DVG to a user's display, the DVG can also facilitate secure bidirectional sessions with remote sources. Specific embodiments detailed herein describe how untrusted pointing devices can be combined with remotely generated (secure) images to provide a trusted back-channel through pointing device position correlation. Such a mechanism, for example, can be used to securely enter a PIN in a banking transaction.

In a further aspect of the use of a DVG it is possible to display the operation of pointing devices and keyboards on the user's display and encode any data they generate for transmission back to the bank so as to ensure the veracity of that data to the banking application used to process the user's transaction. The description of this secure back-channel from the DVG to a remote source is provided through example embodiments of the invention.

Various embodiments will now be described which provide for applications which may differ from the banking transaction process described above.

The DVG disclosed in one embodiment is capable of Transmission-Minimised Differential Signalling (TMDS) signal capture and regeneration in real-time. In an addition to the basic DVG functionality, USB repeater and encryption functionality for both a USB mouse and USB keyboard is provided, allowing human interface operations such as for example, both mouse movements and keystrokes on a keyboard to be captured, encrypted and then passed through to a local computing device in-line using preferably in-band signalling.

Figure 6A:
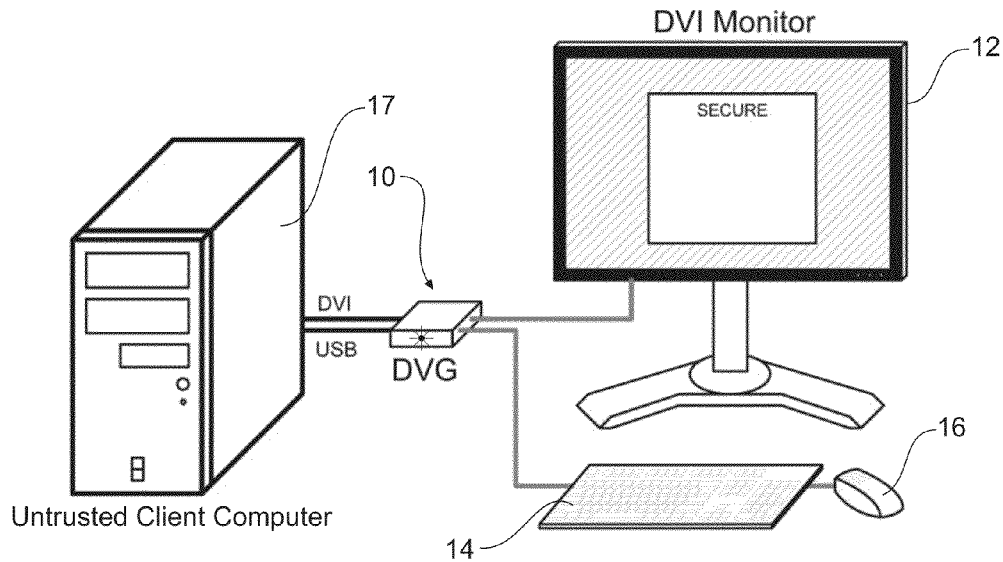
FIG. 6A depicts an in-line arrangement of the DVG between an untrusted local computer and a digital monitor.
Figure 6B:
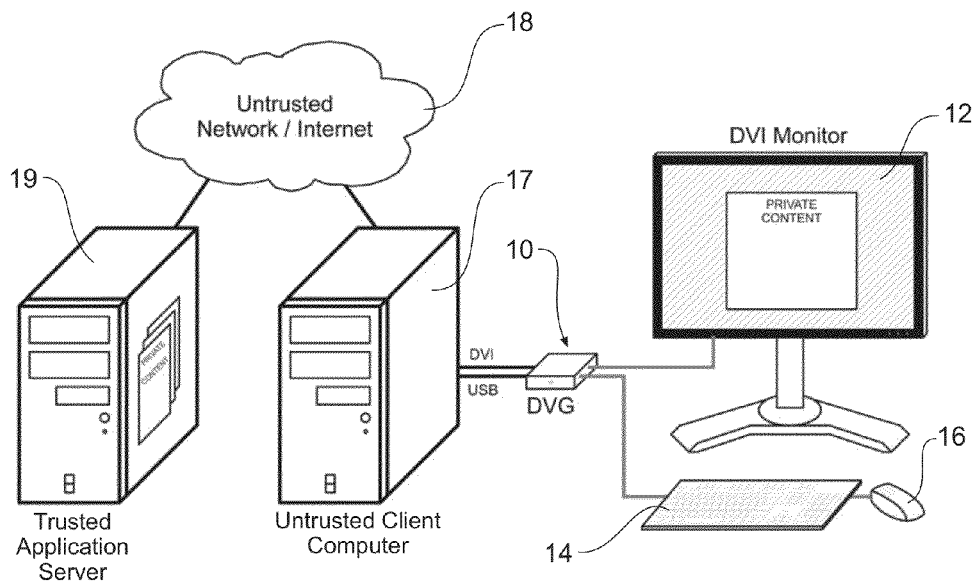
FIG. 6B depicts an example flow of trusted content from a server to an untrusted client, destined to be displayed via a DVG.

FIG. 1 depicts one embodiment of the DVG as an in-line DVI security device, sometimes referred to as a dongle. The DVG 10 is inserted in-line between an untrusted client computer 17 (served from a server 19 shown having a physical connection in this figure via a network 18, such as for example the Internet) and a DVI display 12, with the keyboard 14 and mouse 16 optionally routed through the device 10. FIG. 1 illustrates how the DVG intercepts, in one example, a digital video stream as well as the keyboard and mouse data and is usable in the example described wherein a user of the untrusted client computer 17 and display 12 can securely interact in transacting business with their bank. FIG. 6A and FIG. 6B show the physical embodiment of a DVG 10 as an in-line security dongle connected between an untrusted client computer 17 and a Digital DVI display 12 and USB peripheral devices such as the pointing device 16 and the keyboard 14 working with the local untrusted client computer (FIG. 6A) and to the remote computer device such as in this embodiment the Trusted Application server 19 via the untrusted computer network/Internet 18.

Figure 2:
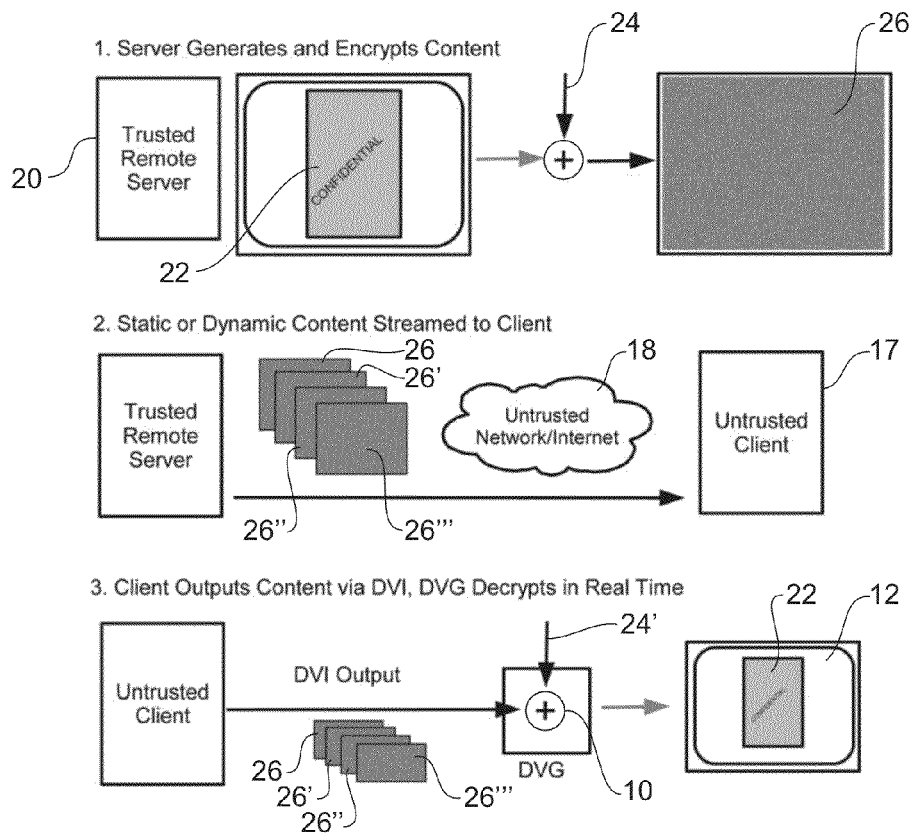
FIG. 2 depicts an a broad example digital video operation of the DVG.
Figure 5:
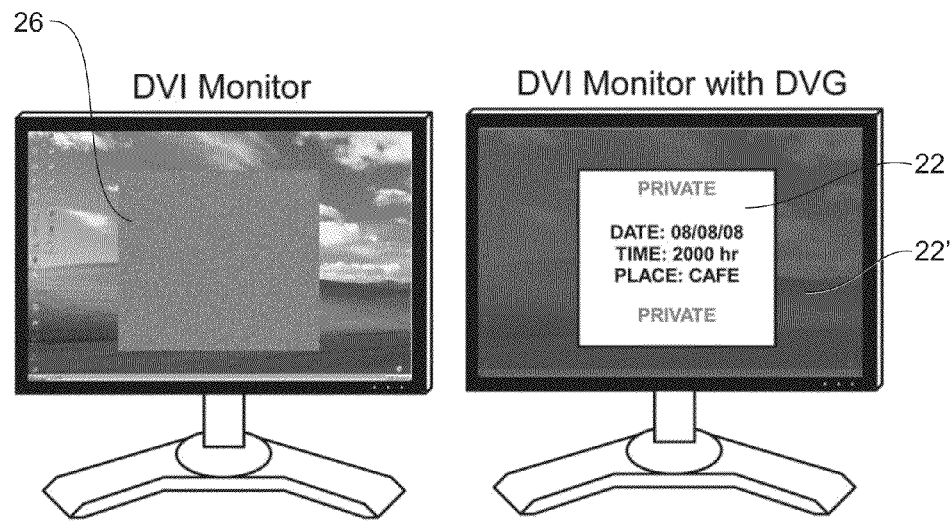
FIG. 5 depicts an example output from the DVG on a monitor compared to the output without the DVG.

By way of illustration FIG. 5 depicts an example of how decrypted content will display on a Digital Video display without and with a DVG in place. The left hand monitor in FIG. 5 shows a normal Operating System being displayed and a large portion of the screen rendered as pixels with random appearance 26. The content being displayed has been encrypted by a remote server (as illustrated in FIG. 2) and each pixel appears as random data until it is decrypted. The right-hand monitor in FIG. 5 shows the output when an appropriately keyed DVG is in place. The DVG can decrypt the encrypted content 22 on the fly and output it for display. The DVG can also modify the remaining unencrypted pixels in any manner 22', typically by randomising, blacking out, or greying out the pixels. In the example of FIG. 5 the remaining pixels have been greyed out. When the DVG successfully decrypts and outputs trusted content the trusted status indicator changes state so in this example it changes from being off to on, that is from off to lighted.

FIG. 2 depicts the use of the DVG in a case where a trusted remote server 20 generates digital content 22 (in this example a single page of a document) and encrypts 24 the content to generate encrypted content 26 (which is transmitted using any suitable means 18 to a user's computer and when displayed without using a DVG has the form shown at 26. Encrypted digital content 26, 26', 26" and 26''' (conveniently shown as multiple screen shots) is sent using untrusted digital communications infrastructure 18 to an untrusted client computer 17. Without the use of a DVG any and all of the displayed encrypted content is a rendered as random pixel on the video display on the untrusted client computer 17 and an associated screen (monitor) 12 (refer to FIG. 1). If an appropriately cryptographically keyed DVG 10 is located between the untrusted client computer 17 and the client monitor 12 the original content 22 can be decrypted and displayed.

Figure 3A:
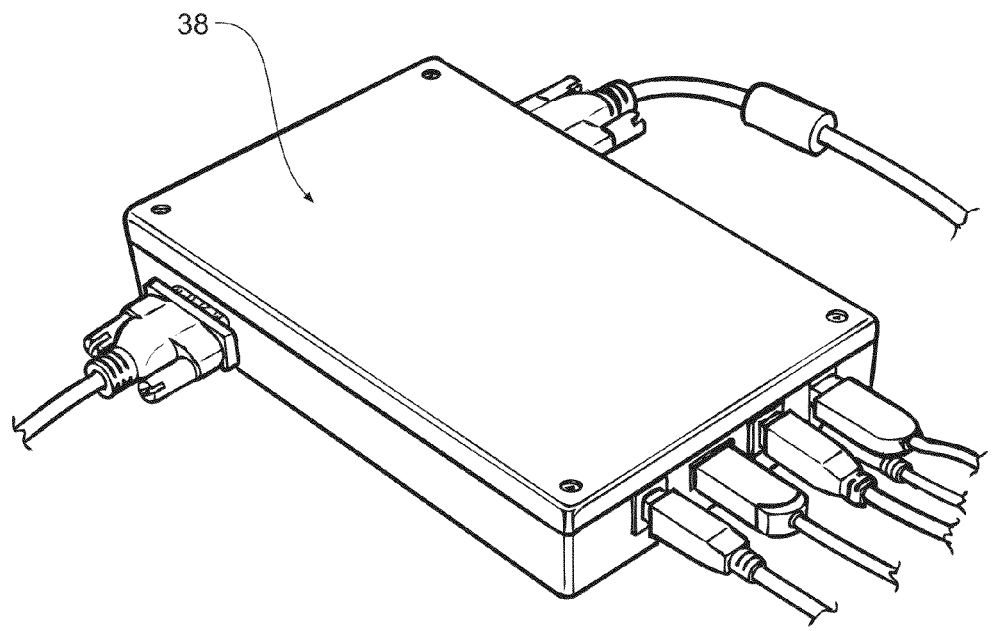
FIG. 3A depicts an example hardware arrangement of the DVG.
Figure 3B:
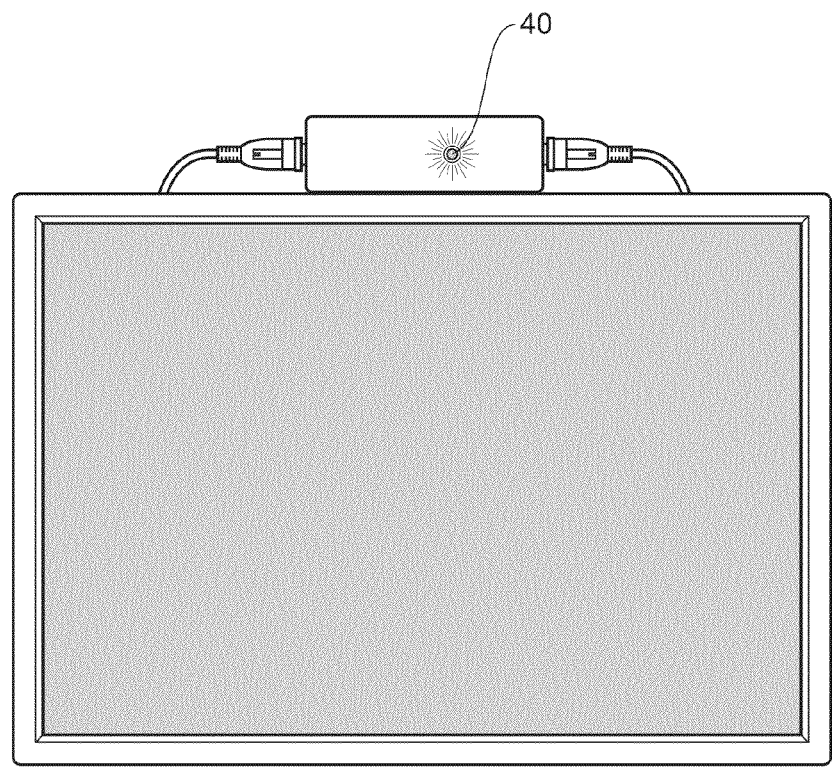
FIG. 3B depicts an example DVG in operation showing the trusted indicator (LED)

FIG. 3A shows an example of a hardware version 38 of the DVG 10 of FIG. 1. The physical casing displayed is but one embodiment, the physical size of the casing being merely related to the size of the various internally located components and/or the size and configuration of the input and output connectors. It is envisaged that the physical configuration of a DVG could range from a cable with suitable connectors and an in-line DVG device located between the input and output pins of the connectors to a case of the type depicted in FIG. 3A and it may also be possible to fit such a device internal to another device, such as for example the case of a computer, a router, or any device which acts as a peripheral to a computing arrangement. FIG. 3B shows an example of the DVG device of FIG. 3A showing in particular a trusted status display device, in this example a Light Emitting Diode (LED) 40 which could alternatively be a lamp or any other type of visible light generation device associated in an acceptable way with the DVG 10.

Figure 4A:
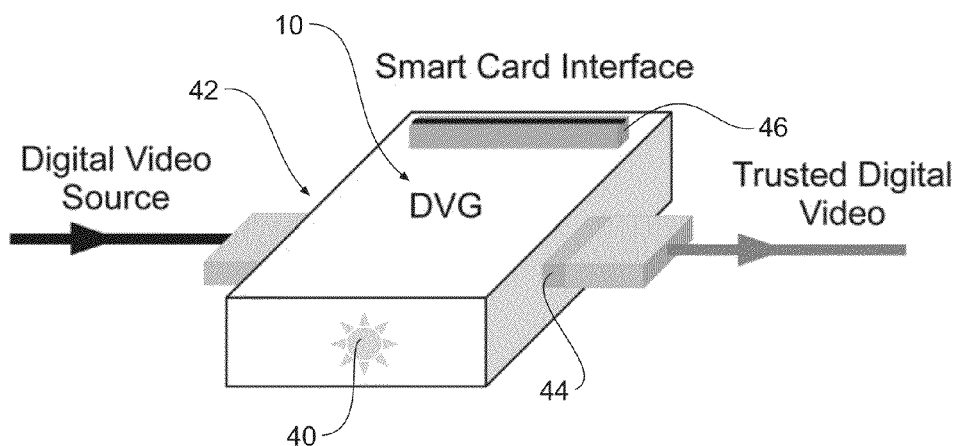
FIG. 4A depicts an example embodiment of the DVG with Digital video data input and output and Smart Card Interface.

FIG. 4A depicts an example physical embodiment of the DVG showing a Digital Video data input 42, a Digital Video output 44, a trusted status indicator 40 (having in this example an off state and an on state) and a cryptographic smart card interface 46. The digital video source is an untrusted input and typically connects from an untrusted computing device. The cryptographic smart card interface is used to provide services for cryptographic functionality detailed throughout this specification. The trusted status indicator is a LED that is lit when the DVG is outputting trusted content via its output Digital Video port—typically this port is connected to a Digital Video display device.

Figure 4B:
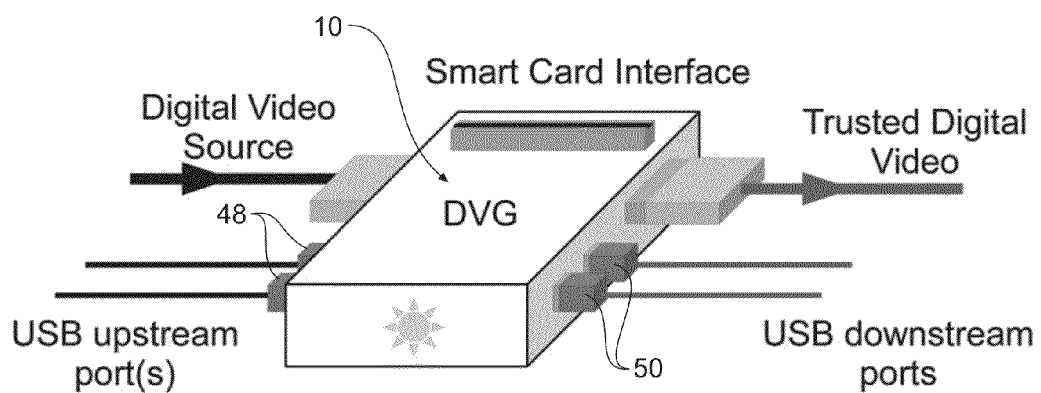
FIG. 4B depicts an example embodiment of the DVG with Digital video data input and output, upstream and downstream USB ports and Smart Card Interface.

FIG. 4B depicts a more complex example embodiment of the DVG where USB upstream ports 48 and downstream ports 50 are connected to the DVG 10. The downstream ports allow USB device such as pointing devices, keyboards, and mass storage devices to be attached to the DVG. The DVG is able to either directly interface with these devices, directly utilising their input and output, or encrypt their communications and pass them via upstream USB ports to the untrusted computing infrastructure. This tunnelled USB communications can be transmitted over untrusted infrastructure to an appropriate trusted remote server.

In the embodiments of FIG. 4A and FIG. 4B the DVG digital processing logic (not shown) along with the trusted status indicator, the smart card interface and the Digital Video output all need to be trusted.

Figure 7A:
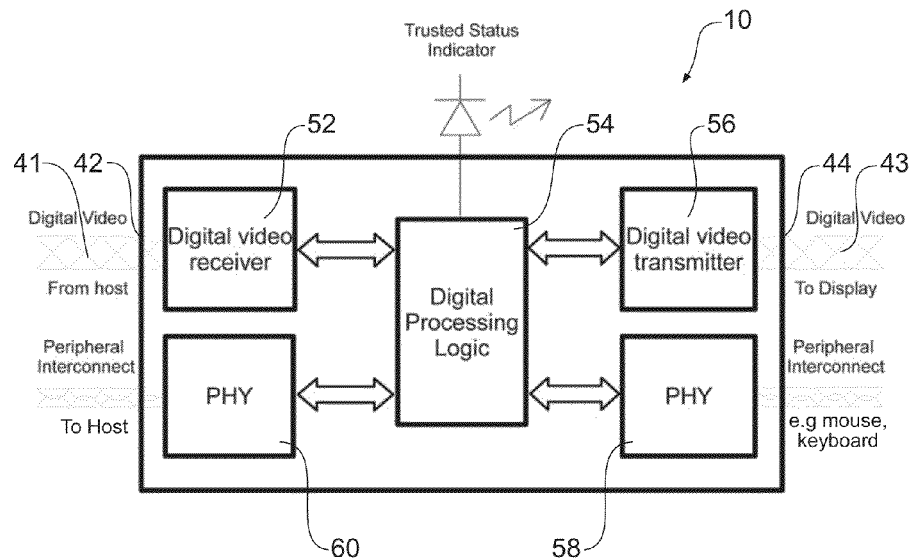
FIG. 7A depicts an example generic architecture of the DVG including USB inputs and outputs.
Figure 7B:
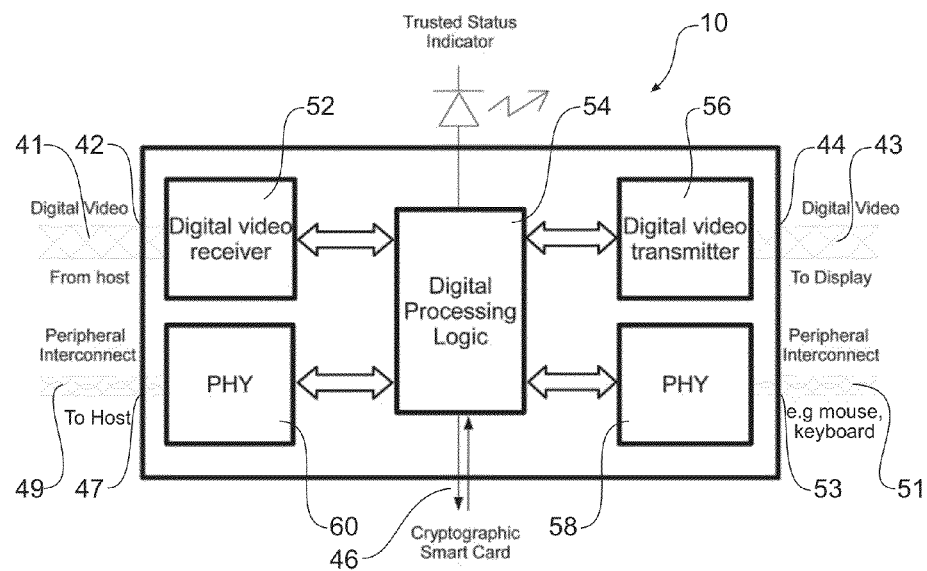
FIG. 7B depicts an example generic architecture of the DVG including a Cryptographic Smart Card interface.

FIG. 7A depicts a block diagram of an embodiment of the DVG 10. In this embodiment the DVG contains a digital video receiver 52 capable of converting a digital video stream 41 via the digital video data input 42 into pixel format, a trusted digital processor for processing such as digital processing logic 54 for performing pixel manipulation, trusted status indicator and a digital video transmitter 56 capable of generating a digital video stream output 43 via the trusted digital video output 44. FIG. 7A also depicts a block diagram of an embodiment of the DVG that also contains low level PHY (PHYsical-layer) chips (58 and 60) to allow peripheral devices (such as a pointer or keyboard) to be connected (a specific example of a general peripheral interconnect output and input which can transmit only or receive only—however, such devices are typically set up as a bi-directional peripheral interconnect port) and utilised by the DVG and optionally consumed or modified. Modified peripheral data that may be protected by encryption can be sent through the untrusted client computer's 17 peripheral interconnect port to be routed over untrusted infrastructure 18 to a remote trusted server 19. FIG. 7B includes a Cryptographic smart card interface 46 implementing cryptographic primitives as required.

In one example the graphics and cryptographic block 54 of the DVG hardware is a Xilinx VirtexII FPGA. When receiving DVI TMDS signals 41 they are, in a preferred arrangement, received 52 and transmitted 56 utilising TFP401A and TFP410 integrated circuits from Texas Instruments.

Figure 8A:
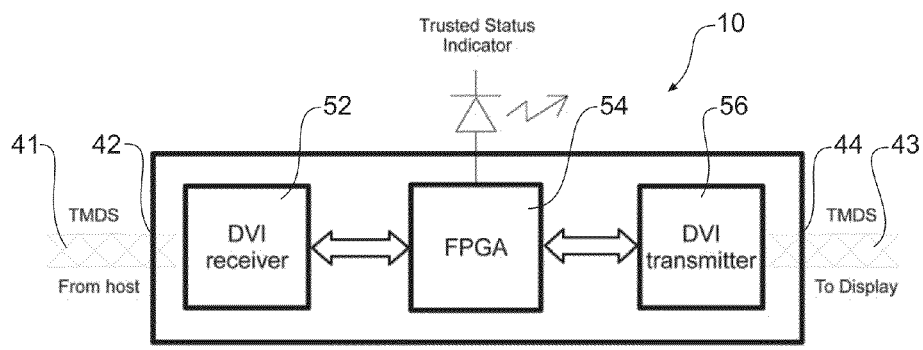
FIG. 8A depicts a specific embodiment of the DVG operating on TMDS signalling.
Figure 8B:
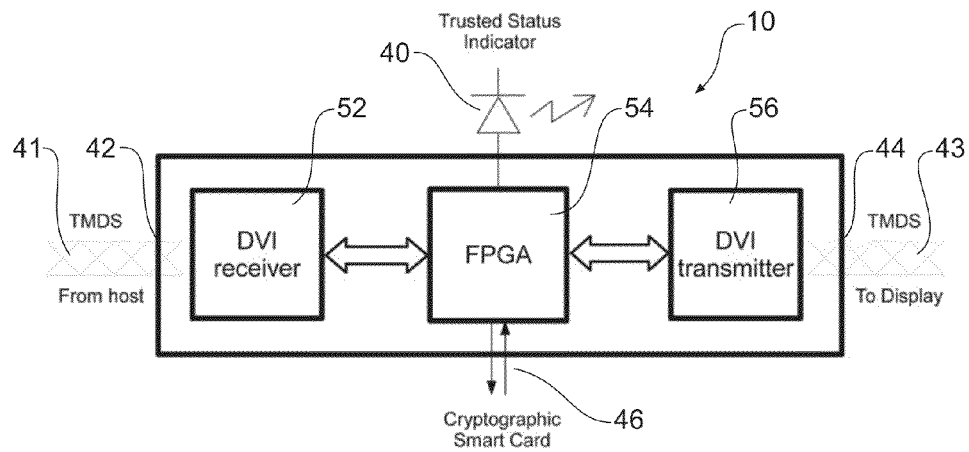
FIG. 8B depicts a specific embodiment of the DVG operating on TMDS signalling and including a Cryptographic Smart Card interface.

A block diagram of the hardware is shown in FIG. 8A, where the DVI receiver is the TFP401A and the DVI transmitter is the TFP 410. All this circuitry may be replaceable by a single Application Specific Integrated Circuit (ASIC). FIG. 8B shows how a cryptographic smart card can be interfaced to this configuration.

Figure 8C:
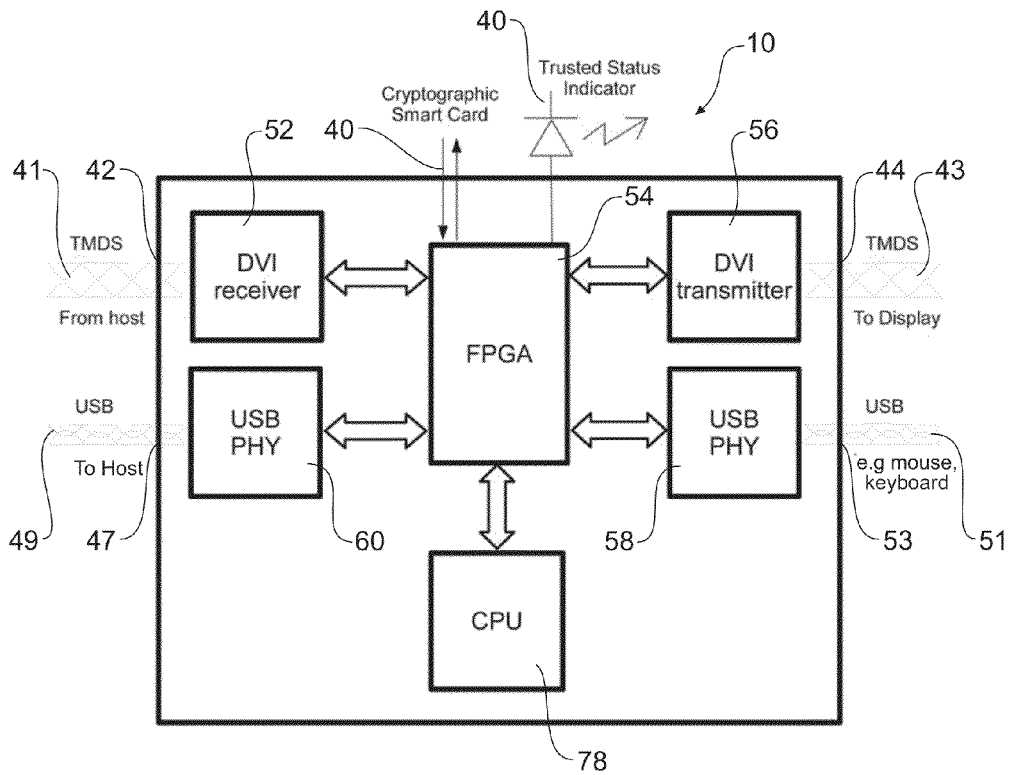
FIG. 8C depicts a specific embodiment of the DVG operating on TMDS signalling and including upstream and downstream USB ports, a CPU, an FPGA and a Cryptographic Smart Card interface.

In an other example of the DVG device, illustrated in FIG. 8C, utilising input from human interface devices the FPGA can connect separate USB PHY chips (58 and 60) (PHYsical-layer chips), providing USB specification version 1.1 compliance. The number and type of special purpose connections (e.g. keyboard, mouse) is a function of the desired design criteria. The FPGA in the example embodiment implements USB hub functionality, allowing it to decode and then regenerate USB signalling as required to implement encryption primitives on the USB data (e.g. keystrokes and mouse movements being data stream 49 and 51 associate with ports 47 and 53 respectively).

Figure 9A:
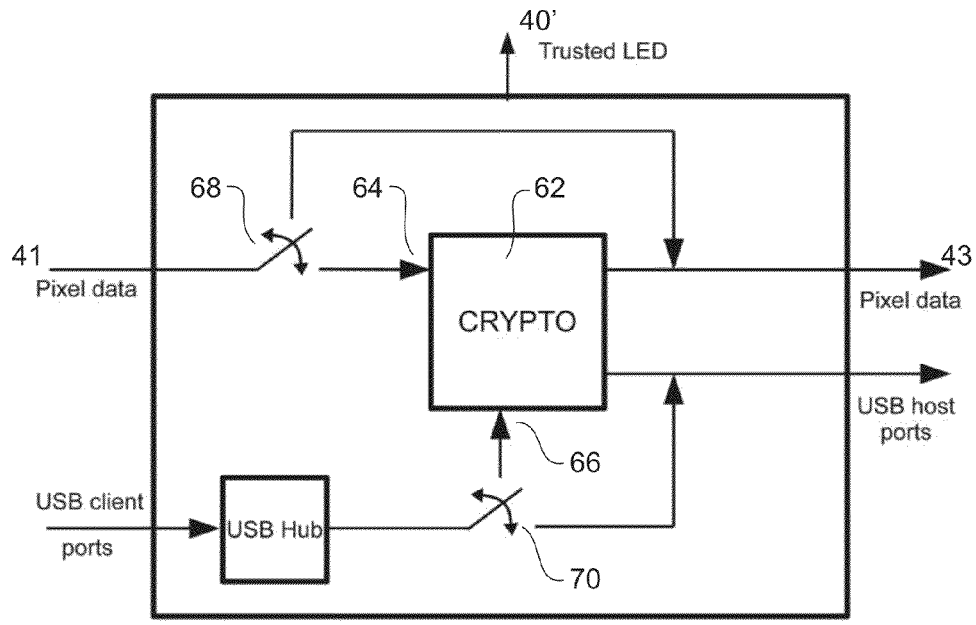
FIG. 9A depicts an example generic FPGA architecture for the DVG.
Figure 9B:
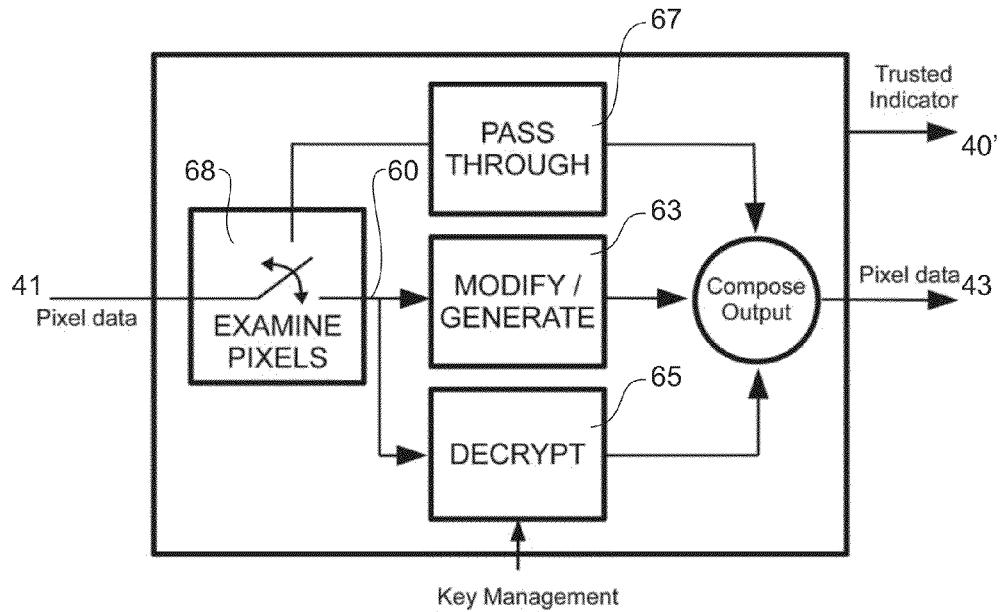
FIG. 9B depicts a specific embodiment of an aspect of the FPGA architecture used for pixel manipulation.
Figure 9C:
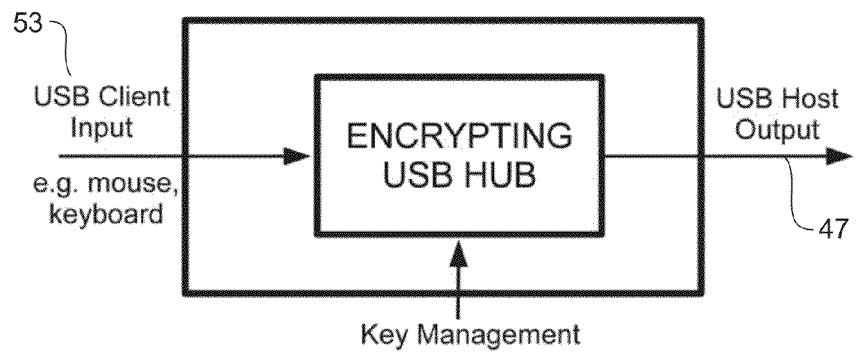
FIG. 9C depicts a specific embodiment of an aspect of the FPGA architecture used for USB peripheral encryption.

In the embodiment of FIG. 8C the main components of the FPGA as shown in FIG. 9A, those components include a cryptographic pixel engine 62 and an encrypting USB hub (FIG. 9C). The cryptographic pixel engine 62 has two inputs 64 and 66 both of which are separately inputs switched by switches 68 and 70 respectively. The switches 68 and 70 are controlled in a trusted manner by the trusted digital processor such as for example FPGA and\or CPU 78 (FIG. 8C) and when the inputs (pixel data 41 and USB signals 51 are directed into the FPGA. FIG. 9B shows the trusted digital processor FPGA 54 as a graphics and cryptographic block that examines pixel data, in this example each pixel data as it is received, decrypting 65, modifying/generating 63, or pass through 67 the data as required before outputting the pixel data to the DVI TMDS transmitter 56 as described above in relation to FIG. 8C and concurrently indicating that if the output has the required veracity (that is trustworthy) in this embodiment, lighting the trusted LED indicator 40 with the signal 40' (FIG. 9A). Similarly, as depicted in FIG. 9C the input (data stream 53) from USB peripherals such as human interface devices is intercepted, interpreted, and then either consumed, modified, or encrypted and sent 47 through to an untrusted computing device 17. Key management is depicted in FIGS. 9B and 9C which relates to the possibility for an authorised user or software function to change the cryptographic key used to decipher and encipher the data. Such changes can be ad hoc or changed according to predetermined circumstances, such as the interaction of the DVG with more than one trusted application server.

In its minimum configuration the DVG hardware and software is very simple and performs a limited set of operations having a suitable level of trust.

The DVG can optionally choose to display or modify any pixel data it receives, allowing portions of the screen to be manipulated so that the display is created using DVG generated pixel data, examples include a blacked out display, greyed out display, decrypted pixel data or pixel data displayed as it is received. All will result in a display that may contain a mixture of trusted content, modified untrusted content, and DVG generated content. Depending on the application all untrusted data might be blacked out by the DVG (i.e. the DVG completely removes the data from the digital video stream), leaving only trusted content rendered on the display.

The DVG hardware can generate trusted video content to be rendered on the display. This content can be based on data input from the mouse or keyboard, meta-data from within the digital video content, or purely DVG generated content (e.g. a random number (nonce) being displayed for use in a cryptographic protocol). The DVG then either overlays or replaces existing (received) content as the digital data stream is sent to the display.

In an example, on receiving video content the DVG decrypts the trusted portion of the content and manipulates the remainder of the display that is not showing trusted data. On successfully decrypting and outputting trusted content the DVG lights a LED to indicate trust in the rendered display being its trusted indicator status. Results from an encrypted video signal being output on a display with and without the DVG are shown in FIG. 5. When there is no trusted content the DVG will display the content supplied from the untrusted computer and the trusted LED will be extinguished being its untrusted indicator status.

Command and Control

Figure 10A:
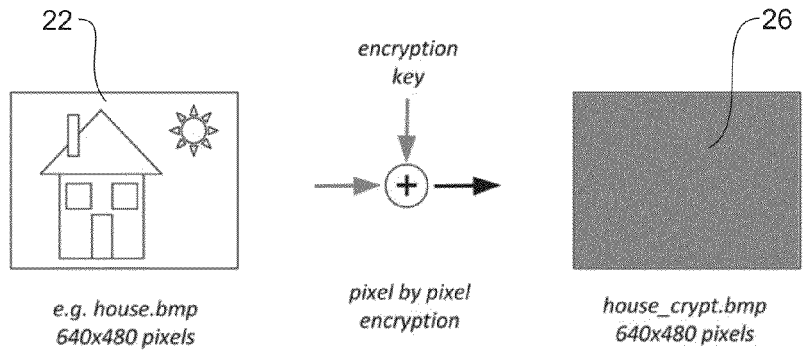
FIG. 10A depicts an example of generating content destined for display through a DVG.
Figure 10B:
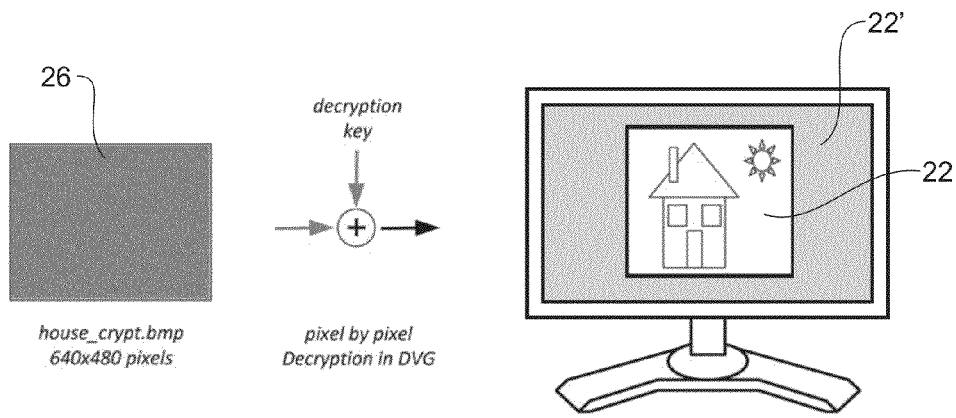
FIG. 10B depicts the reproduction of content displayed through a DVG.

Generating the encrypted content can be done by creating a known bitmap that will be faithfully reproduced when it is displayed on a client/user system. An example of content generation is shown in FIG. 10A whereby an original image (e.g. house.bmp 22) is encrypted pixel by pixel under a known encryption key and algorithm to create an encrypted image 26 (FIG. 10B) of the same resolution. When viewed on a normal display (that is a display that does not have a DVG physically located between the display output of the untrusted computer and the display device) this bitmap will render as pixel data with random appearance 26 and a respective DVG is required to recognise and decrypt the trusted content, and render the image 22 if necessary. FIG. 10B shows how this content, when passed through a DVG can be decrypted to output the original content 22 from the DVG and have it displayed in a trusted manner on a digital video display noting that the display shows trusted decrypted data 22 as well as other display data 22' which is the unencrypted data greyed out.

The DVG can also be used with cryptographically signed video content, in which case the content will display on any display device, but with an appropriately keyed DVG in place the integrity of the displayed content can be guaranteed, indicated by a trusted status indicator.

Identifying the trusted content and framing trusted regions can be assisted utilising in-band communications. Individual pixels within the bitmap can be used to convey information to the DVG, indicating information such as framing, resolution, video content source, etc. On decrypting and recognising this information, the DVG can output null pixel data instead, typically black or grey pixels, however as indicated previously the output can be DVG generated content that may be undecipherable/unreadable/unintelligible/scrambled/unviewable or otherwise modified and created in any appropriate manner known to those skilled in the art. Other methods for communicating with the DVG from the trusted application server 19 include reducing the colour-space or resolution of the displayed content. These communication methods can also be used for enabling the cryptography used with the DVG. The particular cryptography and key exchange if required is a matter of choice and one that is readily within the skill of those in the art.

The DVG can generate new pixel content, allowing any received in-band information to be displayed to the user in a trusted fashion. It is possible for the DVG to overlay this information with the trusted content or render it on another part of the display. When the DVG trusted LED is on, any pixels that are not manipulated such as greyed, blacked out or otherwise changed can be trusted. While normally only trusted content delivered to the DVG is displayed to the user, the DVG can also display information such as the source or classification of the content anywhere on the display, even overlaying it with the content. In this instance the DVG hardware generates the content to be displayed.

The ability of the DVG to generate content can be used for a keying mechanism where the DVG can generate a random number and render it on the display. A user can then acknowledge or use this random number for authentication or keying purposes, which can be useful in banking or similar applications to establish the identity of the user and also for assisting the key management process.

Figure 11A:
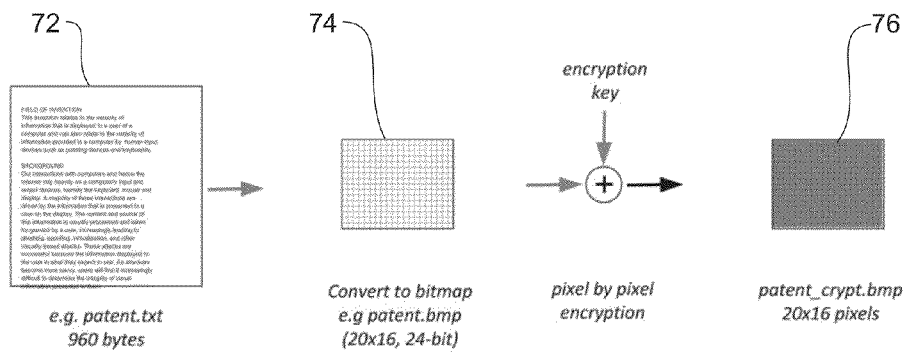
FIG. 11A depicts an example of generating non-imaged based content for display through a DVG.
Figure 11B:
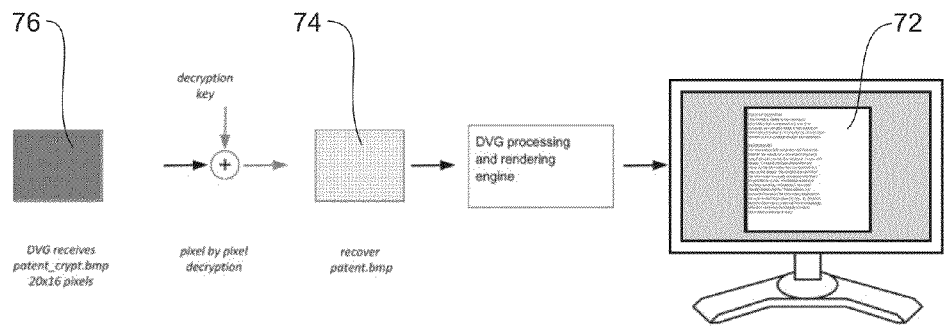
FIG. 11B depicts the reproduction and display of non-image based content through a DVG.

The digital content to be encrypted at the source is not limited to video information. FIG. 11A depicts an example of a 960 byte text document 72 that can be converted into a 20 pixel×16 pixel 24-bit resolution image 74. This image can in the same fashion as previously described be encrypted and destined for display 76 through a DVG. FIG. 11B depicts a DVG receiving such an encrypted image 76, in this example the DVG is required to decrypt the pixel data and then extract the original text document 72 from the image. Once extracted the DVG can reproduce the original text document 72 and render it into the trusted digital video output, suitable for display on a digital video display. This operation requires more complex digital processing logic to be present in the DVG, and potentially include such items a Central Processing Unit (CPU) 78 as depicted in FIG. 8C or graphics accelerator chip.

Figure 12A:
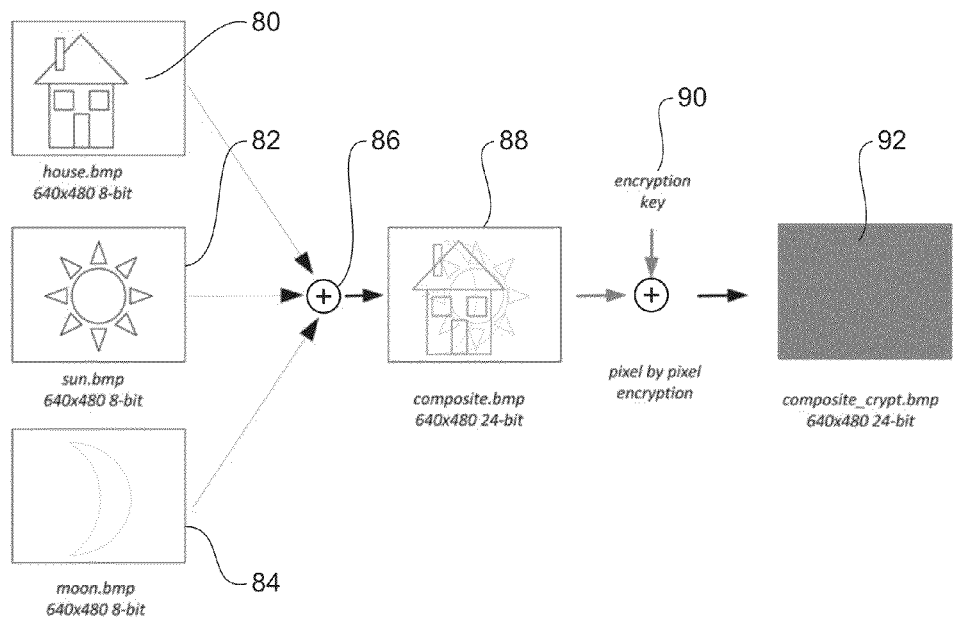
FIG. 12A depicts an example of combining multiple content streams destined to be displayed through a DVG.
Figure 12B:
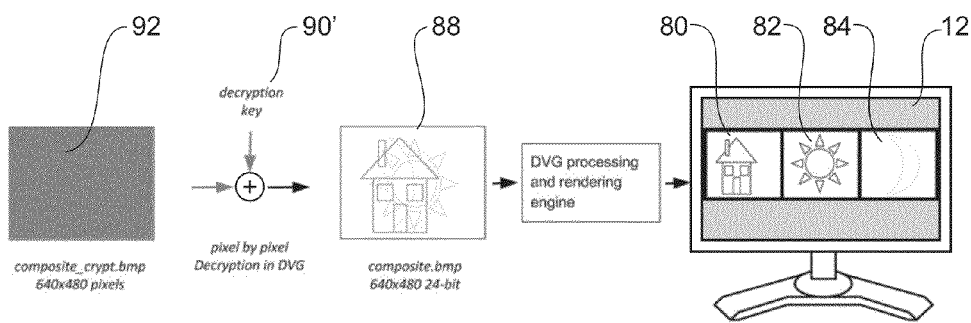
FIG. 12B depicts the reproduction and display of multiple content streams through a DVG.

Similar in-band communications methods can also deliver multiple content streams to the DVG. It may include multiple video streams (digital data stream), application specific coding (e.g. HTML, that the DVG can interpret and act upon), or control streams (e.g. firmware updates for the DVG). This multiplexing of data can occur by utilising the available bandwidth, e.g. the multiple video streams can be compressed or reduced in colour-space. FIG. 12A depicts this multiplexing of multiple content streams, whereby 3 separate 640×480 resolution, 8-bit images (or streams) 80, 82 and 84 are combined 86 into a 640×480 resolution, 24-bit single image (or stream) 88. Once combined the single image (or stream) is encrypted 90 to a file which without appropriate decryption displays like 92 and can be transported across untrusted infrastructure ready for display through a DVG. FIG. 12B depicts the DVG decrypting 90' this image 88 and then utilising digital processing logic in for example a CPU 78 (FIG. 8C) to separate the multiple images 80, 82 and 84 before suitably outputting them to the trusted digital video output for display on a digital video display 12.

Figure 13A:
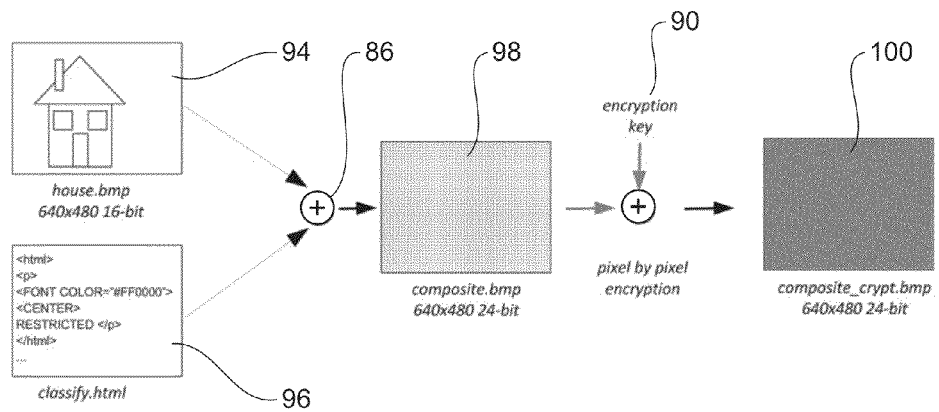
FIG. 13A depicts an example of combining different types of content streams destined to be displayed through a DVG.
Figure 13B:
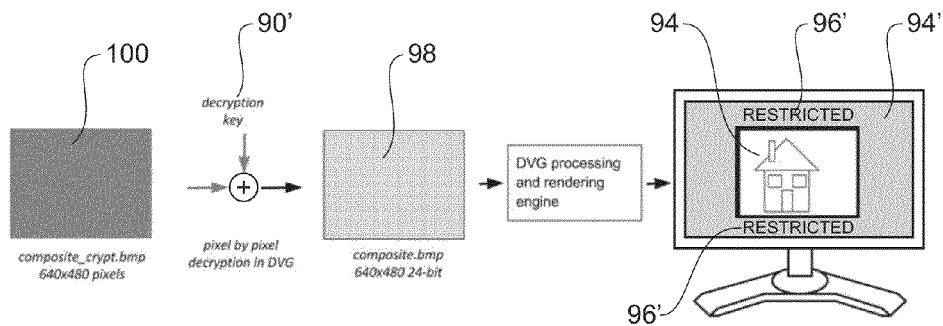
FIG. 13B reproduction and display of different types of content streams through a DVG.

This flow of multiplexed trusted data streams, can potentially come from different sources and be encrypted using different cryptographic keys, this allows the DVG to implement and enforce a variety of different security applications. For example, The DVG may receive a security classification encoded within the pixel data the DVG can then create an image and render this security classification on the display. The DVG trusted i.e. will indicate that displayed data is trusted and has been either decrypted or generated by the DVG. FIG. 13A depicts an example of a 16-bit, 640×480 resolution image 94 being combined 86 with some HTML 96 to form a 24-bit 640×480 resolution image 98. This combined image 98 can then be encrypted 90 to a file which without appropriate decryption displays like 100 and destined for a DVG. FIG. 13B depicts a DVG receiving the encrypted combined image 100. On decrypting 90' this image 100, the DVG is able to extract and display the original image 94. The DVG is also able to interpret the other information. In this example the extra information is some HTML 96 indicating to the DVG to mark up the output with a specific classification. In the example of FIG. 13B the DVG outputs the text "RESTRICTED" 96' to the display to indicate the security classification of the displayed data. The DVG can either overlay this text with the original image, or as is the case in the example render it on some other portion of the display. In the example all other untrusted content has been greyed out.

Mouse and Keystroke Information

Human to computer interface devices such as cursor control devices (mouse), keyboards and/or biometric devices and input peripheral devices in general need to be protected to ensure confidentiality of user entered information, and to ensure the integrity of the application. Simple cursor protection is provided through the interaction with displayed trusted images as described in the earlier embodiments of the invention.

A further aspect of the DVG provides for the encryption of these input devices. This is achieved in-line utilising USB hub functionality within the FPGA and by way of non-limiting example herein, mouse and keyboard input can be encrypted such that it maps onto a domain that does not cause problems for the client PC, or interfere with the DVG application. The need to secure keystrokes is self evident especially for applications such as banking accounts and associated passwords e-mail and word processing, however it can be equally important to secure mouse information. A prudent configuration choice would include use of a single known keyboard at all times, such as for example a roll-up keyboard or a projector type. As for cursor control devices such as a mouse there is less likelihood of such a device being compromised and less that can be done with the data generated to compromise the security of the user.

One possible protective measure against this cursor misuse is to stop the flow of all cursor control device (mouse) positioning information by the DVG mixing the cursor icon into the secure display locally. The trusted cursor position can in one example be transmitted to the remote application by multiplexing it within the encrypted keyboard traffic.

Attempts to render spoofed cursor locations on the display will result in disruption of the cryptographic data sent to the DVG and hence the Trusted LED will extinguish as the signed portion of the display is compromised by the spoofed cursor display. The second artefact that will be apparent to the user is that they will lose the trusted display, or portions thereof, as the encryption of the display will be broken by the display of the spoofed cursor.

The DVG 10 (FIG. 14) guards the mouse 16 and keyboard 14 data, optionally examining, encrypting, and consuming the data before it is passed 49 to the local untrusted client computer 17. The encrypted keyboard and mouse data 49 is forwarded to a remote trusted server 19 via the untrusted network/Internet 18 where it can be decrypted 24'. Communications with the untrusted client computer can be in-band within the mouse and keyboard data or utilising an out of band USB channel. The DVG can use this encrypted USB channel for setup and configuration messaging with a remote server.

Application Architecture

The DVG enables the development of secure application architectures, particularly those in which users interact with remote servers. In a preferred embodiment the DVG interacts with a trusted remote server. Representative application architecture is shown in FIG. 1. Here a trusted application server is accessible via an untrusted network. The remote user accesses this trusted application server via the untrusted network and via an untrusted client computer with the addition of the DVG.

Yet further example configurations of the DVG to secure specific applications are described herein. The first example is a lightweight application aimed at securing the delivery of content from a website, with no requirements for securing the mouse or keyboard. The second example adds the encryption of the keyboard and mouse to provide increased capabilities for securely interacting with a remote server.

Secure Website Interaction

Figure 14:
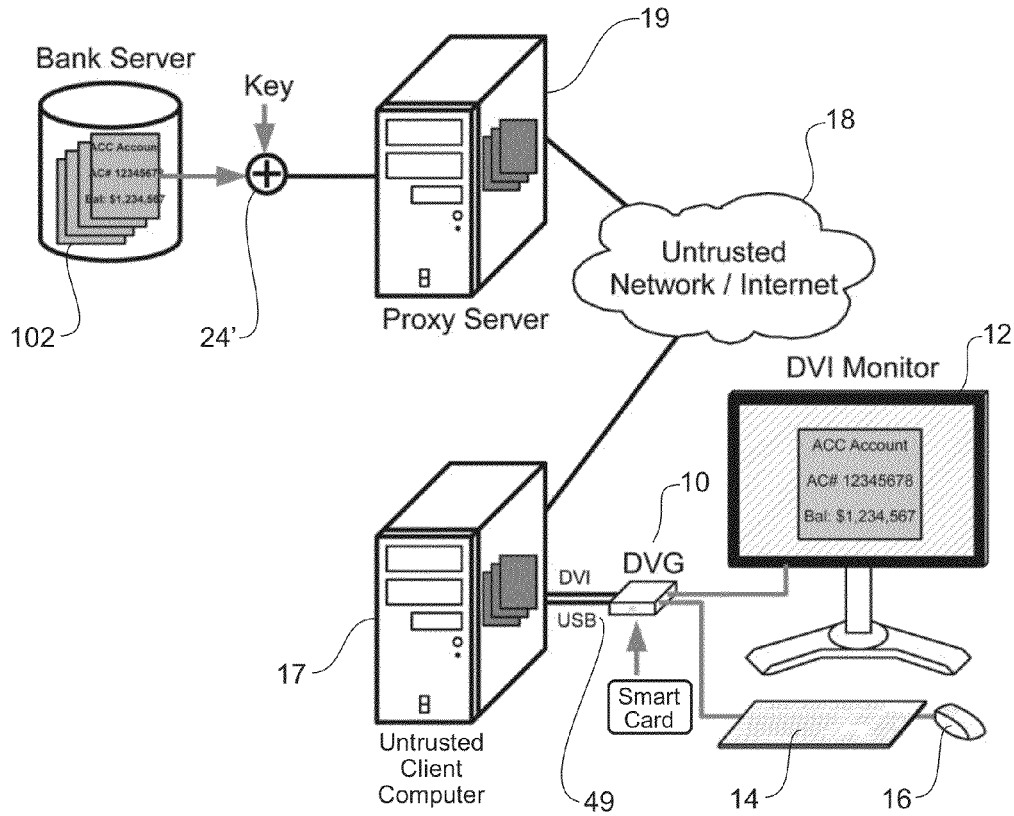
FIG. 14 depicts an embodiment of the DVG being used in an example Internet banking scenario.

In an example scenario a user interacts with a trusted banking web server utilising the DVG to secure the connection and require no trust in the network infrastructure or client-side computing facilities—only requiring trust in the DVG. FIG. 14 depicts this application architecture, whereby a trusted remote banking web-server operates behind a firewall/proxy and a user connects via this firewall/proxy to the banking web-server 102. A DVG 10 is used between a users (untrusted) computing facilities and their digital display 12, in this example the DVG is keyed using a bank-issued smart card (not shown) but the DVG is not unlike that depicted in FIGS. 4B, 7B, 8B, and 8C.

Figure 15A:
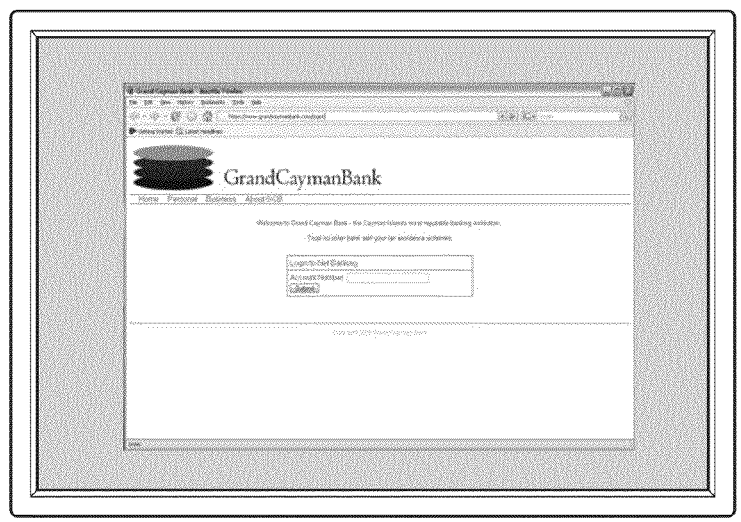
FIG. 15A depicts a screen shot of a video display device showing an Internet banking web site login screen.
Figure 15B:
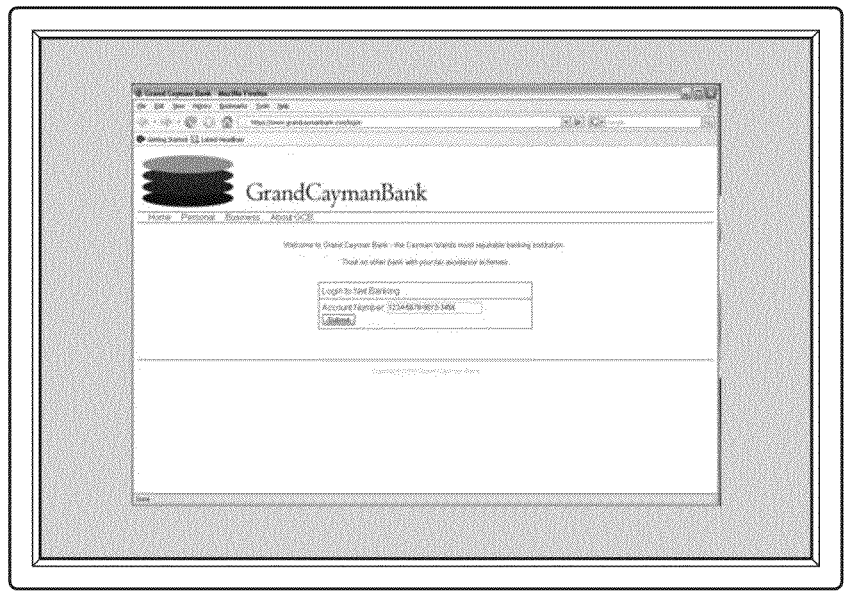
FIG. 15B depicts a screen shot of a video display device showing an Internet banking web site login screen with details entered.
Figure 15C:
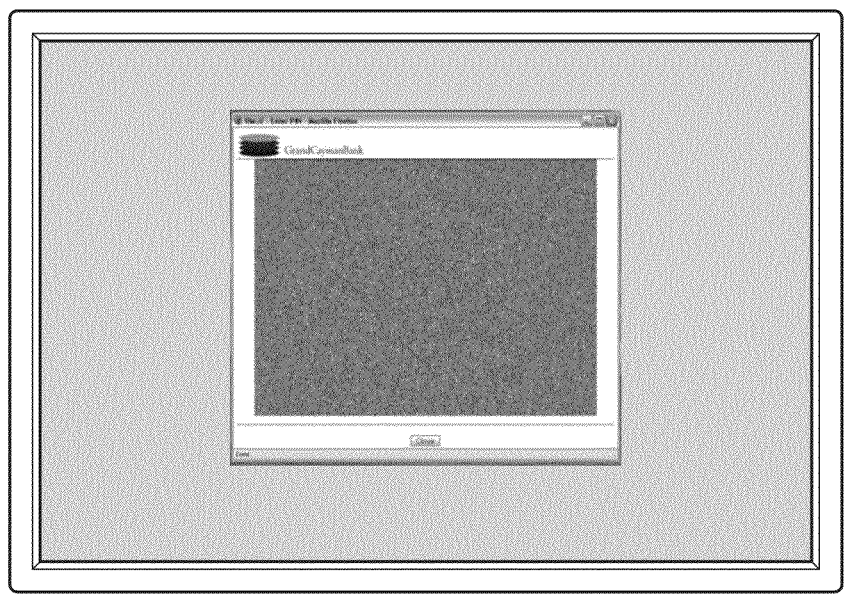
FIG. 15C depicts a screen shot of a video display device showing an Internet banking web site login screen provided partly from a trusted server and the undecipherable/unreadable/unintelligible/scrambled/un-viewable or otherwise modified portion of the screen is the result of not having a DVG device in place.
Figure 15D:
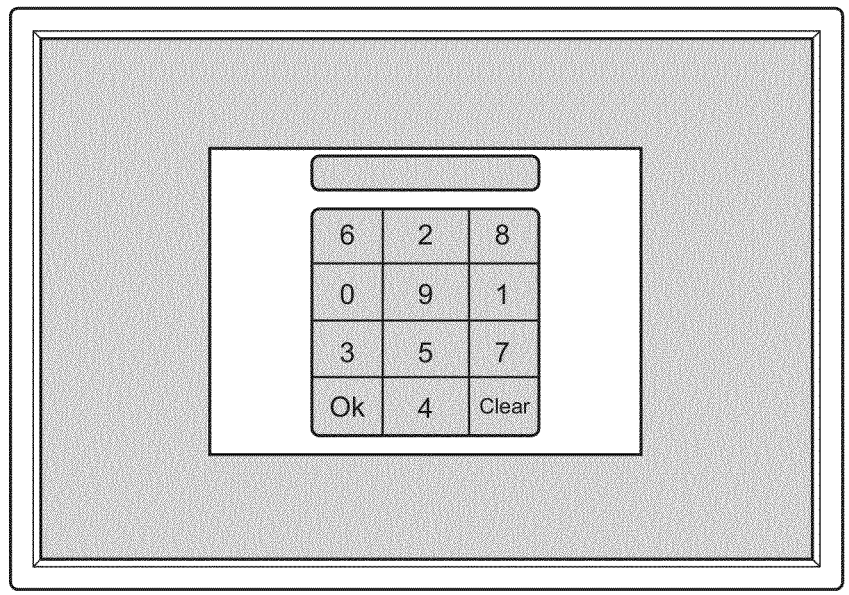
FIG. 15D depicts a screen shot of a video display device showing an Internet banking web site login screen shown in a trusted portion of the video as displayed on a screen through the DVG.
Figure 15E:
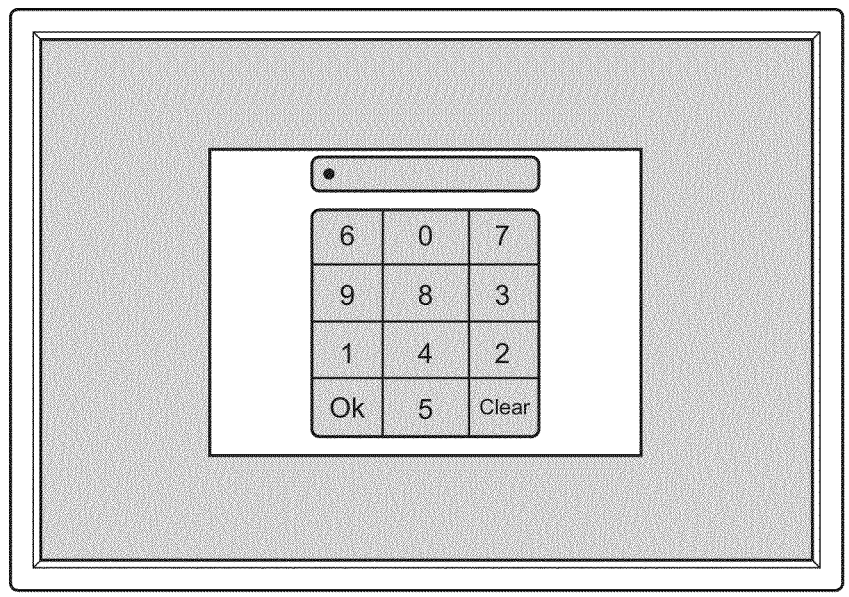
FIGS. 15E-H depict screen shots of a video display device showing an Internet banking web site login screen as a Personal Identification Number (PIN) is being entered. The login screen is shown in a trusted portion of the video as displayed on a screen through the DVG and the on-screen keypad is randomly scrambled between PIN digit entries.
Figure 15F:
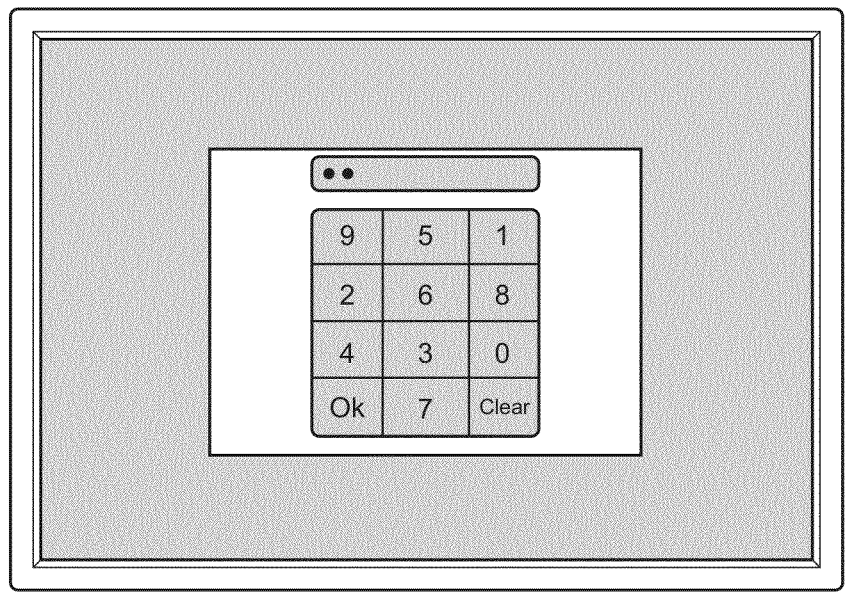
Figure 15G:
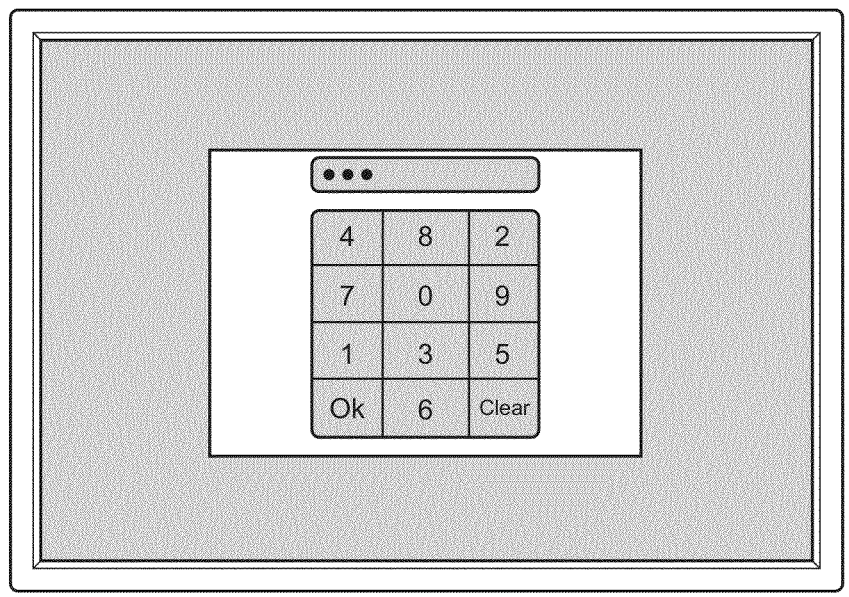
Figure 15H:
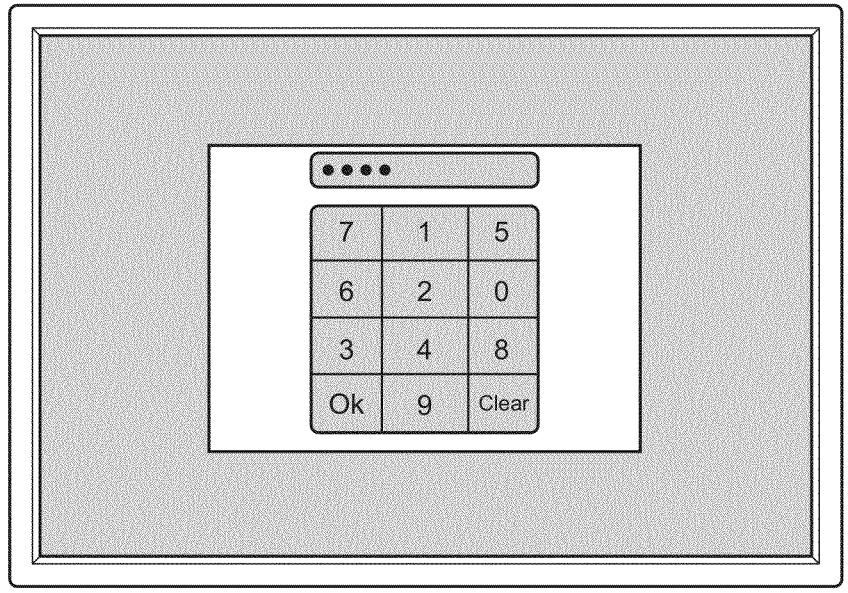
Figure 15I:
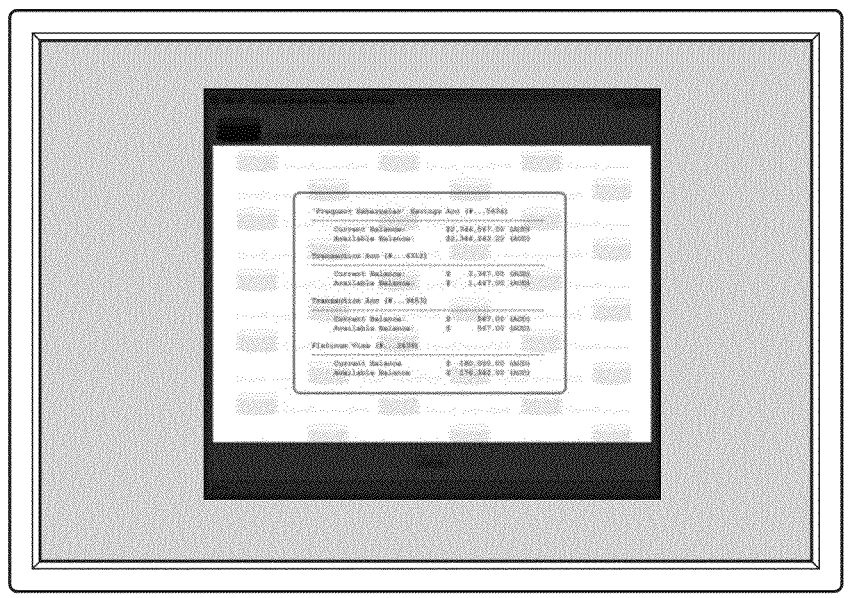
FIG. 15I depicts a screen shot of a video display device showing an Internet banking web site account information screen provided partly from a trusted server and the undecipherable/unreadable/unintelligible/scrambled/un-viewable or otherwise modified portion of the screen is the result of not having a DVG device in place.
Figure 15J:
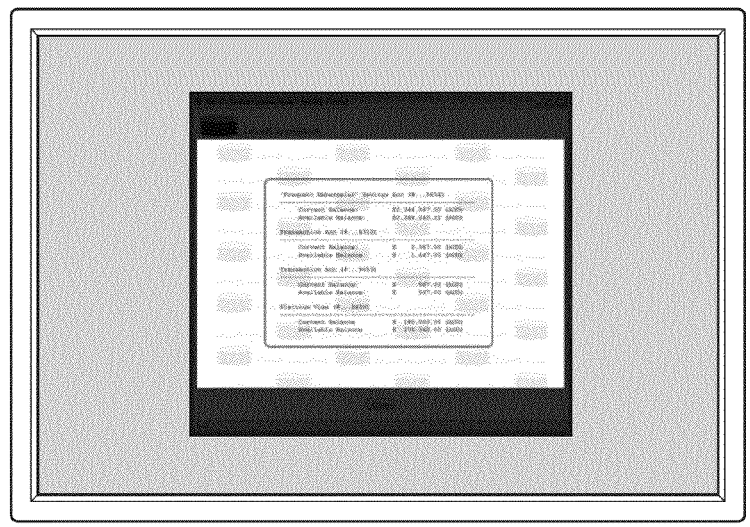
FIG. 15J depicts a screen shot of a video display device showing an Internet banking web site account information screen shown in a trusted portion of the video as displayed on a screen through the DVG.

In the example scenario a user browses to their on-line banking website as shown in FIG. 15A, the same screen would display with or without the DVG. Entering a unique account identifier requests a login screen from their on-line banking website FIG. 15B, again the same screen would display with or without the DVG. At this stage the banking web server encrypts the login screen pixel by pixel and presents this screen to the user. Without a DVG the user is displayed a random pixel image in their browser as shown in FIG. 15C. With the DVG in-line the login screen is decrypted in real time and presented to the user FIG. 15D, with the remainder of the display greyed out and the trusted LED lighted. In this example scenario, a randomised keypad is used for the login screen and is scrambled between digit selections. FIG. 15E through FIG. 15H show PIN entry and the continuously scrambled onscreen login keypad. This onscreen keypad can be generated by the DVG or the remote server (in this embodiment the randomised keypad has been generated by the remote server). Once the user has been authenticated via their PIN, as entered via the onscreen keypad—the remote server correlates the mouse position clicks with the onscreen keypad that is randomised between mouse clicks—the user's account information is shown. Without the DVG in place the account information renders as random pixel data and cannot be recovered without the appropriate cryptographic key, the user's screen without the DVG is shown in FIG. 15I. FIG. 15J shows the output on the screen when an appropriately keyed DVG is in place.

For this particular application a range of DVG configurations have been conceived to target cost sensitive markets, such as consumer Internet banking, as well as higher end security sensitive markets, such as business or financial market applications. Two specific DVG system configurations to implement the secure website interaction in a commercial situation are described as follows:

DVG consisting of Application Specific Integrated Circuit (ASIC) with smartcard reader, DVI input and DVI output, broadly illustrated as in FIG. 8A, with the DVI receiver, DVI transmitter and FPGA replaced by an ASIC. This configuration would have an external interface similar to that depicted in FIG. 4A; and DVG consisting of ASIC and embedded CPU, smartcard reader, DVI input, DVI output, and USB switching hub, broadly illustrated as in FIG. 8C, with the DVI receiver, DVI transmitter, USB PHYs, CPU and FPGA replaced by an ASIC. This configuration would have an external interface similar to that depicted in FIG. 4B.

In the first configuration depicted in FIGS. 8A and 4A the remote application's display is protected end-to-end from the trusted application server through to the DVG. Keying is supported by a user's smartcard, as depicted in FIG. 14 and accessed through the interfaces shown in FIG. 4A and FIG. 8A, which can hold private and public keys allowing the remote application server (which can be the trusted application server) to send a signed certificate with an encrypted session key for the user—typically a bank issued smartcard. Mouse and keyboard information are not protected in this setup, however protection of PIN and other similar information is possible by using continually random scrambled keypads with the user entering information by mouse clicks. This mechanism has been described by way of previous example as is illustrated in FIGS. 15E-H for the Internet banking website scenario. As the display is protected by the DVG and the keypad order is continually scrambled the information is protected. This method is sufficient for protecting small numbers of PINs. It quickly becomes impractical if the user needs to enter a large amount of information. Additionally, if the remote application's menu system and control buttons are not similarly randomised a threat exists whereby an attacker can inject mouse and keystroke information in the unprotected channel.

The second configuration considerably increases the security and performance of the DVG. Keystroke and mouse information is now sent directly to the DVG from the USB peripheral and can be encrypted by the DVG. Full station to station key negotiation can take place using the USB channel. Importantly, the performance of this configuration can be considerably improved over the low cost DVG configuration. Compression, encryption, partial updates, and windowing protocols are all possible by utilising the increased processing power of the embedded CPU. As a result of the improvements the secure website would provide protection for user entered information and it would increase the performance of the applications making it suitable for sensitive financial transactions, and webmail where text processing is involved.

A trusted digital data guarding method that can be used for controlling the display of trustworthy and untrustworthy data on a digital video display device will include the following steps. Receiving at a digital video data input untrustworthy digital data and in-band trustworthy digital data. The trusted digital video output outputting digital video data to the video display device. Processing with a trusted digital processor operatively connected to the digital video data input, trusted digital video output and trusted status indicator, so as to processes in-band digital data to identify trustworthy and untrustworthy digital data. The processing also including directing, untrustworthy digital data to the trusted digital video output; and/or trustworthy digital data to the trusted digital video output, as well as controlling the status of one of at least one trusted status indicator to the trusted indicator state.

Secure Remote Application Delivery

Figure 16:
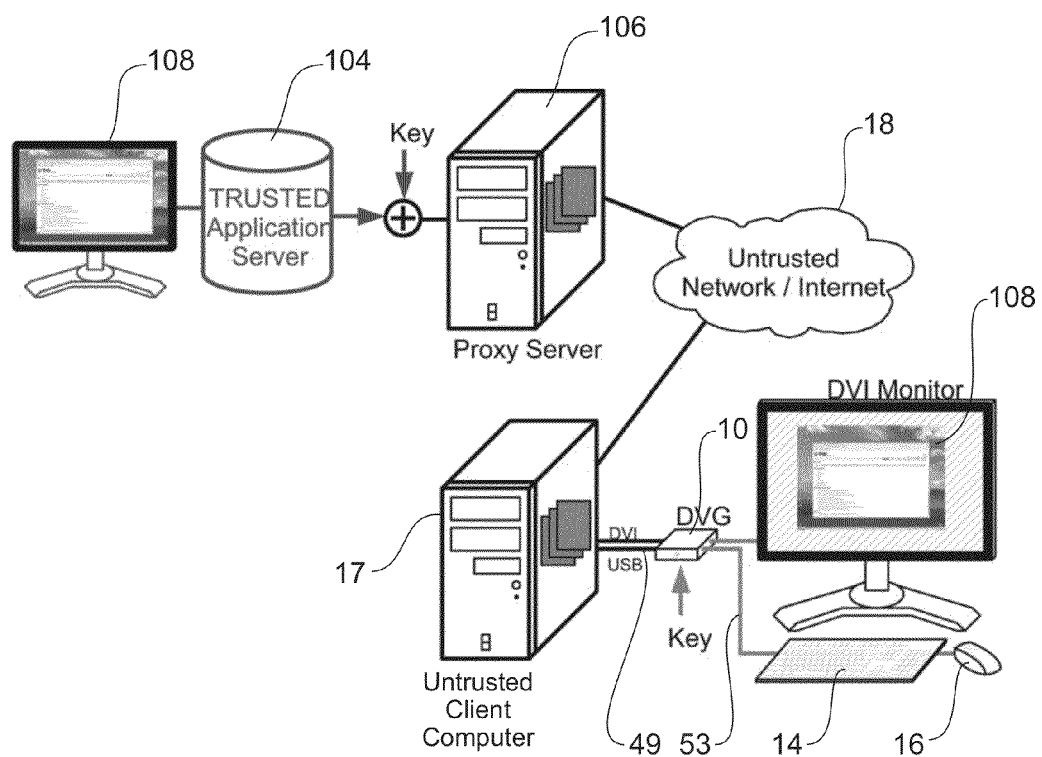
FIG. 16 depicts an embodiment of the DVG being used in an example remote application scenario.

Another embodiment of the DVG is the Secure Remote Application Delivery (SRAD) application, as depicted in FIG. 16. In this embodiment a remote trusted server 104 executes computing applications in a secure remote environment. These applications can be accessed via a firewall/proxy 106 to the trusted server 104. The outputs from the application (video) 108 are protected by the DVG and the inputs to the application (e.g. mouse, keyboard signals 53) are also protected by the DVG utilising the encryption primitives on the USB channels 49.

This embodiment utilises the DVG 10 to provide a secure thin client solution. It provides a generic method for securely accessing applications on a trusted remote server 104 via an untrusted network 18 and client computer 17. This architecture requires the use of a server-side application on the trusted remote server 104, but only an untrusted viewer application on the client machine.

An application layer protocol is used to carry encrypted screen buffers from the trusted remote server, encrypted keyboard and mouse data from the client, and other signalling information. This network traffic is protected in transit by encapsulation within an encrypted tunnel e.g. IPSec or SSH—It is implicitly protected via encryption destined for and generated by the DVG The server-side application is responsible for running applications on the server on behalf of clients. It accepts TCP connections from clients to establish SRAD sessions. During an SRAD session, DVG encrypted keyboard and mouse events from the client are decrypted and executed on the server. Concurrently, the server performs screen captures of the local desktop from which it generates an encrypted video stream in the form of encrypted screen buffers which are sent to the client.

The client-side GUI application displays the remote desktop from the server and sends mouse and keyboard events back to the server. Mouse and keystroke data is encrypted as it passes through the DVG's in-line USB hub, before reaching the client application. Encrypted screen buffers are received and displayed by the client application, and decrypted as they pass through the DVG to the digital display. As the client application is not exposed to any decrypted data, there is no necessity for lack of trust in its integrity.

Figure 17A:
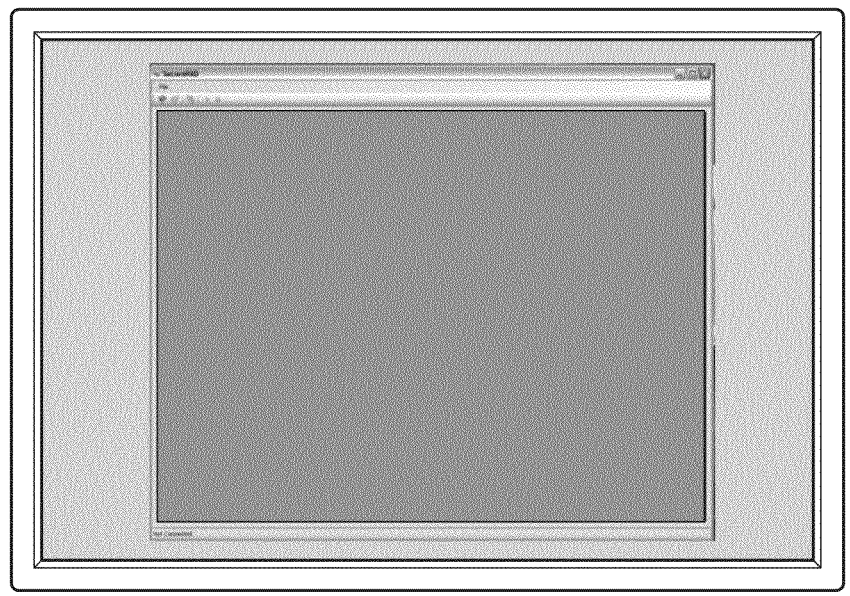
FIG. 17A depicts a Secure Remote Application Delivery application.
Figure 17B:
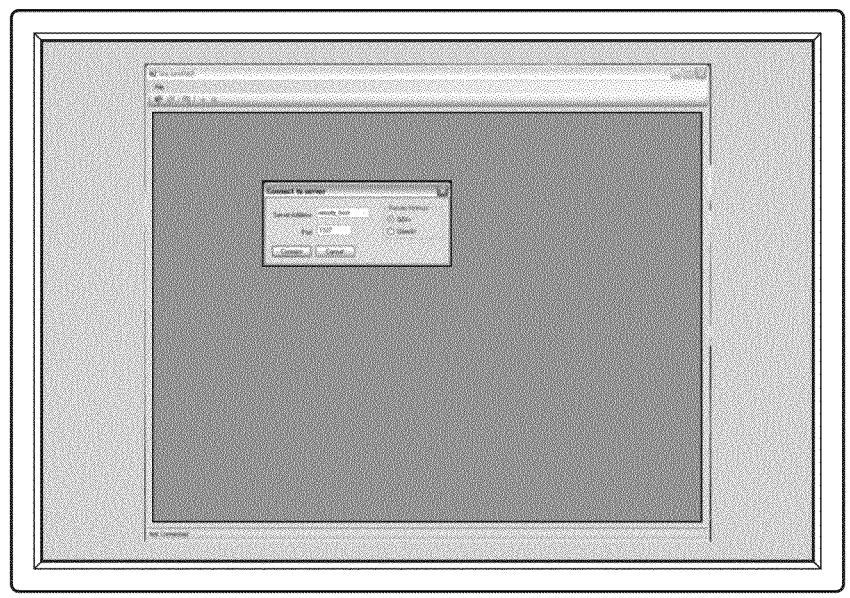
FIG. 17B depicts a Secure Remote Application Delivery application initiating a connection to a remote server.
Figure 17C:
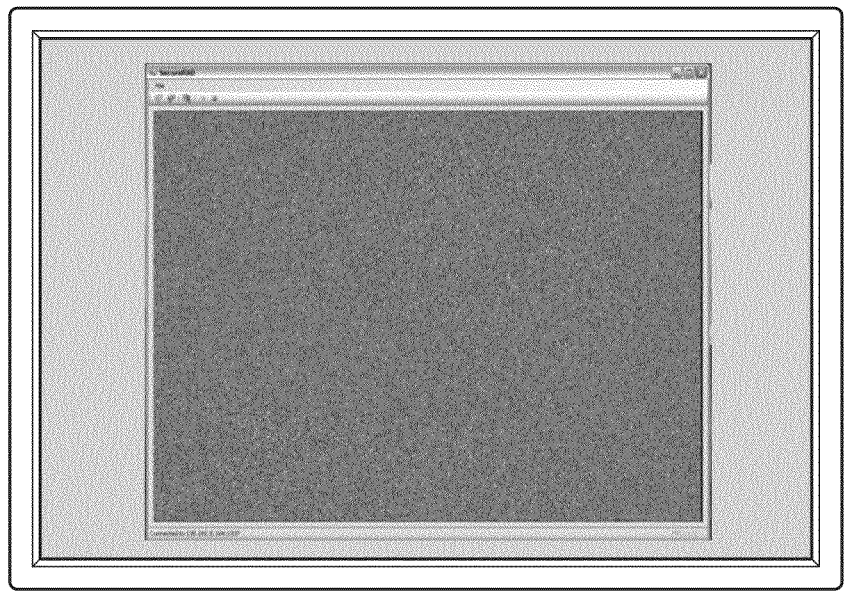
FIG. 17C depicts a screen shot of a video display device showing a Secure Remote Application Delivery application screen provided partly from a trusted server and the undecipherable/unreadable/unintelligible/scrambled/un-viewable or otherwise modified portion of the screen is the result of not having a DVG device in place.
Figure 17D:
FIGS. 17D-F depict screen shots of a video display device showing a Secure Remote Application Delivery application screen provided partly from a trusted server and the application is shown in a trusted portion of the video as displayed on a screen through the DVG.
Figure 17E:
Figure 17F:
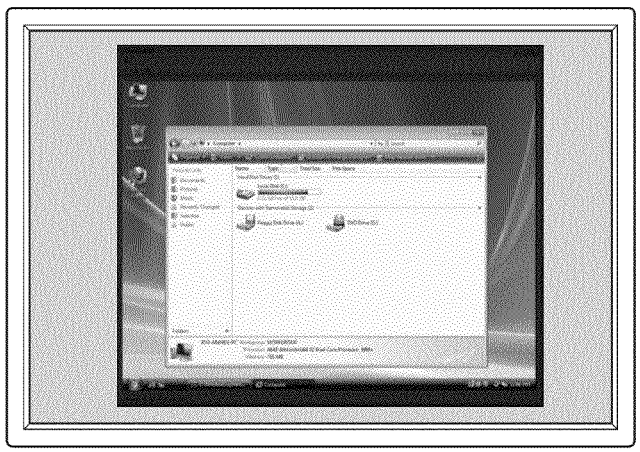

A digital data security method for delivery over an untrusted digital data network, of trusted video data from a trusted server to a video display device associated with a computer device includes the following steps. Processing received trusted video content from the trusted server in a digital video device operatively connected to the trusted server and encapsulating the trusted video data with a predetermined file format. Transferring the encapsulated trusted video content over the untrusted digital network to the computer device associated with the video display device, and processing in a digital video guard which controls the display of trustworthy and untrustworthy data on a digital video display device including the steps of: receiving at digital video data input untrustworthy digital data and in-band trustworthy digital data; processing with a trusted digital processor operatively connected to the digital video data input, trusted digital video output and trusted status indicator, to processes in-band digital data to identify trustworthy and untrustworthy digital data and for directing, untrustworthy digital data to the trusted digital video output; and/or trustworthy digital data to the trusted digital video output, and controlling the status of one of at least one trusted status indicator to the trusted indicator state. The final step in an aspect of the invention is outputting digital video data to the video display device at the trusted digital video output, FIG. 17A shows the SRAD application running and FIG. 17B shows the SRAD application initiating a connection with a trusted remote server. These two outputs would display the same regardless of whether a DVG is in place or not. Once a connection has been established to the remote server a remote application session can begin. Without a DVG in place the application renders as random pixel data as shown in FIG. 17C. With an appropriately keyed DVG in place remote applications can be displayed and interacted with. FIG. 17D through FIG. 17F show interaction with a remote application utilising the DVG. In this example the untrusted portion of the displayed has been greyed out, leaving only the trusted remote application. In this example an entire session has been controllable remotely, similar to the functionality provided by Microsoft's *Remote Desktop* or the VNC application.

With minimal modifications SRAD can be utilised to provide a tunnel through which a user can interact with a higher classification or more sensitive network from an untrusted or lower classification machine. The encrypted mouse and keyboard information can be pumped up to the more sensitive network and the encrypted screen images can be released via approved encryption devices. Further decoupling from the sensitive network can be achieved utilising complementary hardware to generate the encrypted screen images, similar to that described in this specification, when discussing the Digital Video Encryptor as described below in greater detail.

The bandwidth requirements for utilising the DVG in the SRAD application are significant, Some options to overcome the bandwidth requirements for SRAD include:

Colour-space reduction—send a colour-space reduced representation of the screen capture. The DVG can store each frame and expand it as it is sent to the display.

Intelligent local processing—allowing the DVG to function as an X client and utilise the DVI for in-band signalling of the network traffic.

Compression—similar to the colour-space reduction the DVG can decrypt, store and decompress the pixel data before it is sent to the display.

Partial updates—divide screen captures into subsections (tiles), and encrypt and send to the DVG separately. When the screen changes, only send the tile that has changed.

With colour space reduction, partial updates, and compression alone it is envisaged that the performance of the SRAD application will be substantially improved allowing Internet delivery for a large class of applications. Colour space reduction, partial updates, and compression can all be implemented in silicon without substantially altering the complexity and consequently the trust evaluation requirement for the DVG.

The SRAD application can also be implemented and deployed as a Web Browser plug-in (e.g. ActiveX), Java applet, or Flash application. Essentially functioning as a fully privileged application embedded within a webpage (and thus able to communicate with the server over TCP sockets), this approach avoids the text entry problems described earlier.

Keyboard and mouse events will still be protected provided they pass through the DVG's USB hub in the same way as the standalone SRAD application Simplified SRAD type applications can provide for the remote trusted delivery of securely encrypted content to USB thumb drives that may be connected to the DVG.

Cryptographic Protection and Session Key Negotiation

There are two cases that need to be addressed when considering cryptographic protection of the content stream. These two cases correspond to the two broad system configurations and can be summarised as:

DVG with trusted back channel as illustrated in FIGS. 4B and 7B; and

DVG with no trusted back channel as illustrated in FIGS. 4A and 8B.

For a DVG with a back channel supporting an encrypted session any form of commercial or military best practice cryptography that utilises bidirectional communications for session negotiation can be used. In this case the back channel can be tunnelled over a USB connection and forwarded to the server by a client side proxy residing on the untrusted client machine. A simple instantiation of the cryptographic protocols may be public key cryptography for session key negotiation and Advanced Encryption Standard (AES) symmetric cryptography to secure the session. For this scenario two public key certificates may be installed on the DVG—one used for deriving a session key, and one used for updating that certificate. These certificates can reside on a user token such as a smart card or USB device which plugs into the DVG. Extensible Authentication Protocol-Transport Layer Security (EAP-TLS) with mutual authentication may be used to initiate the session and exchange session keys, and the data stream encrypted by AES.

The DVG does not have to permanently store any cryptographic keys, the smart card holds certificates, and it can also perform the cryptographic primitives necessary to verify the identity of the remote host and decrypt the session key. A session key or an action within a pre-determined time period is usable.

The second configuration without a trusted back channel is more problematic. Just using a unidirectional stream the server may still send a public key cryptography signed and encrypted session key to the client. This will necessitate that the client first identifies itself so that the server may use the appropriate client's public key to encrypt the session key. However, as this is a unidirectional data stream—the server cannot rely on or trust the initial client authentication as this necessarily takes place within the untrusted host—so it is vulnerable to replay attacks. There is nothing stopping an adversary spoofing the client's identity and then caching a trusted session by recording the delivered content from the Server. Certainly, they will not be able to decrypt or modify the information; they are however at liberty to replay this content at a later time.

There are a number of potential solutions to the replay problem:

Include a time signature in the self-signed certificates

Have the DVG generate a nonce and send this to the server by way of user assistance The first solution would involve integrating a synchronised real time clock in the DVG. The server can now leverage this shared notion of time to include a time signature, or nominate a valid time window in the self signed and encrypted certificate containing the session key. Replay attacks are still possible, however the time period in which they can be successfully leveraged will be dependent on the drift between the two clocks on the server and the client, and the size of the time window specified by the server for which the session key is valid. It should be noted that the real time clock on the DVG resides within the trust boundary of the DVG. Time synchronisation may also be possible from the server to the client within the protected data stream emanating from the server.

The second solution to the replay problem is for the client (DVG) to generate a nonce and communicate this to the server as part of the key negotiation sequence guaranteeing freshness of the session key. There are a number of methods for achieving this, relying on the DVG influencing the user to generate the nonce on the untrusted host. A simple mechanism is for the DVG to display the nonce and have the user type this nonce on the untrusted host. Another option is for the DVG to display a keypad, or a visual maze and have the user enter the nonce via mouse clicks and mouse movements. In these examples the DVG is utilising its digital processing logic to generate content and then using its own rendering engine in a manner similar to the classification example of FIG. 13B. As the mouse and keyboard are unsecured in this configuration the nonce is also unsecured. This is irrelevant as the important aspect is that the DVG has generated this nonce and will now only honour a session key presented with this nonce—within a specific time window determined by the DVG.

A third solution which doesn't fully guard against replay attacks but may be sufficiently resistant to them for the purposes of applications such as Internet banking is to include a monotonically increasing session identifier within the wrapped session key. In this way the DVG can record the session identifier and reject any session that is being replayed.

Other Applications

The architecture can also usefully be applied to other scenarios. The ability of the DVG to manipulate and generate video content in a trusted manner can be used to unburden the software security requirements placed on certain computing infrastructure, pushing the work onto the DVG. The following examples are indicative of the role the DVG can play in supporting computer security applications.

Security Tagging

Utilising compression, colour-space reduction, resolution reduction, or unused display regions the digital stream sent to the DVG can consist of more than just an image to be displayed, examples have been shown in FIGS. 11-13. Indeed, it may comprise multiple content streams multiplexed together. This allows multiple video streams as well as additional content and meta-data to be transmitted to the DVG. Such additional content or meta-data can facilitate the generation of a visual security context for displayed information—a useful facility in many applications. Some examples include:

Security classifications can be added to data as it is displayed. The DVG can denote the classification through such means as lighting a trusted LED, annotating the displayed contents with a coloured border or overlaying a textual tag as depicted in FIG. 13B.

Multiple windows of different classifications could be simultaneously displayed, each tagged with its designated classification. The source of each window's content can be from a different remote network—facilitating the display of content from Multi Level Secure (MLS) or Multiple Independent Levels Of Security (MILS) sources. This would be depicted as a combination of FIG. 12B and FIG. 13B.

The DVG can allow the source generated window decorations to dictate the current security level. The DVG will display as monochrome all windows except the current security context which will be coloured. The single trusted LED on the DVG indicates trusted operation and the source generated window decoration dictates the current security level of the window being interacted with.

The DVG can obscure elements of a video signal that are not trusted and only display certain portions of a signal. Different cryptographic keys can be used to secure different portions of the display.

Local Application Signing

The DVG can utilise a Trusted Platform Module (TPM) to ensure that only trusted applications are able to generate content that can be rendered on a display. Any application can write to the frame buffer, however with a DVG in place only certain applications would be able to utilise the TPM to generate encrypted content that could be verified by the DVG. When the trusted LED is active, the user can be confident that the data displayed is from a known and trusted application, verified by the TPM. If the trusted LED is not active a user is aware that some untrusted application, potentially malware, is rendering the content. In an enforcing mode, the DVG could prevent all untrusted content from being displayed. This localised usage of the DVG has been depicted in FIG. 6A.

Digital Video Encryptor

Figure 18:
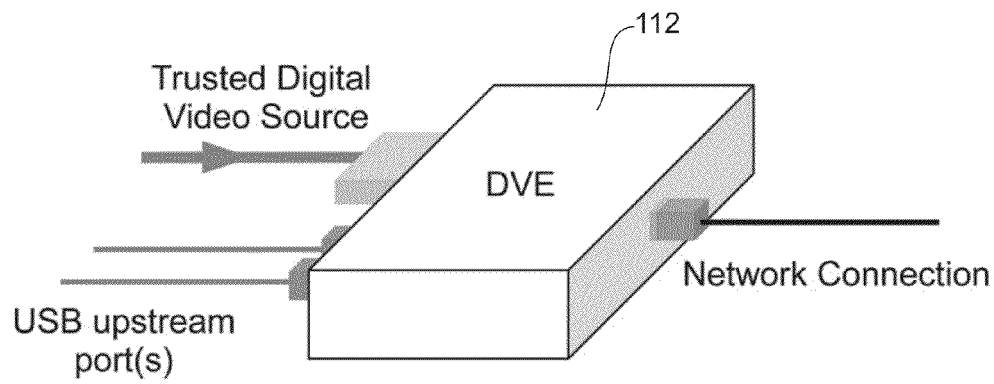
FIG. 18 depicts a complementary embodiment of the DVG, the Digital Video Encryptor (DVE)

The Digital Video Encryptor (DVE) 112 complements the DVG as illustrated in FIG. 18. It is a security peripheral that can be plugged into the DVI port 116 of a trusted server 114 or remote computer, from which the user requires content suitable for viewing utilising the DVG 10. The DVE 112 intercepts the DVI signal 118, encapsulates the content within a specified file format (typically an image file). In one example the DVE encrypts the content and outputs the encrypted digital content 120 over a network interface. An untrusted client 17 can be utilised to receive this content and display it through an appropriately configured DVG 10. In the example using encryption the keyboard and mouse data 49 that is encrypted by the DVG 10 is sent back through the network 18 to the DVE 112, where it is decrypted. The DVE provides a USB connection 122 that can then input the mouse 16 and keyboard 14 data 53 into the remote trusted server 114 of laptop computer.

Figure 19:
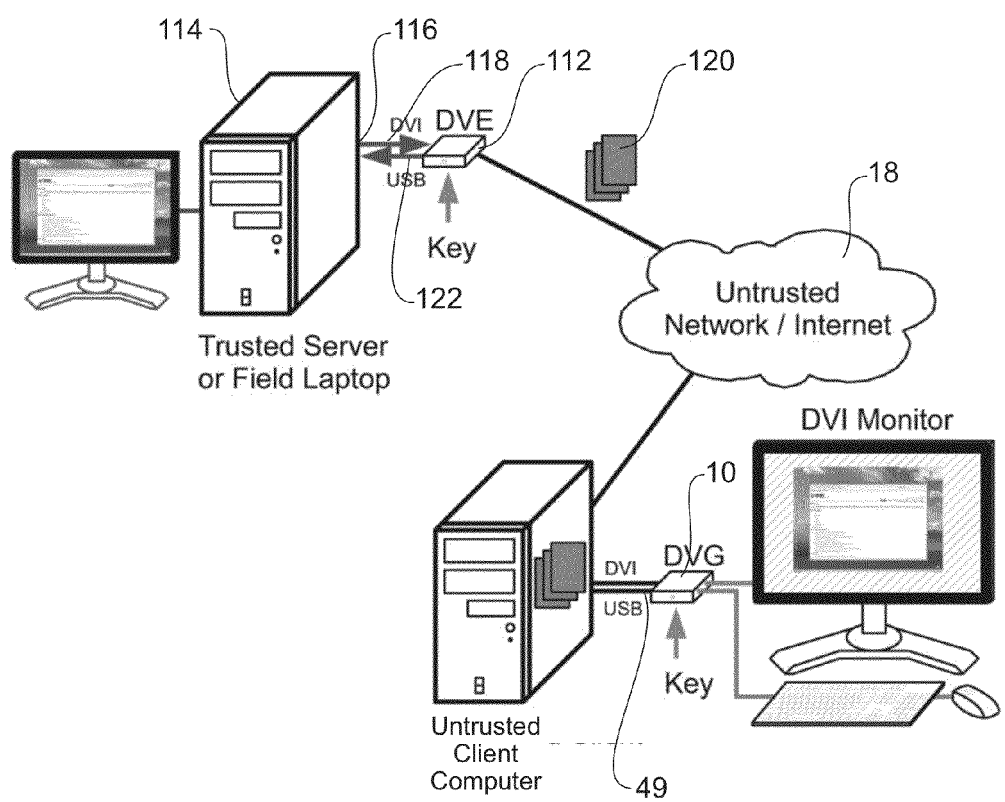
FIG. 19 depicts the usage of the Digital Video Encryptor.

The DVE/DVG pair (FIG. 19) provides a secure channel that can be used for content and application delivery. No software modifications are required on either end, making it ideal for tactical deployment utilising COTS equipment. In a military scenario, a laptop in the field could be fitted with a DVE, the corresponding DVG could be readily installed at a field office, or even Headquarters. This setup would allow secure remote operation of the laptop, as well as a tactical communications channel as illustrated in FIG. 19. In embodiments using encryption, different key pairs might be used by the DVE for each communicating DVG, with common keys available for multi-user applications.

The DVG device provides a channel that can be used for trusted content delivery utilising untrusted COTS infrastructure. The DVG is a simple trusted device that enables this content delivery utilising in-band cryptography within digital content destined to be rendered on a digital display. Bi-directional communications security is achieved through the introduction of a USB guard on mouse and keyboard data, or leveraging user interaction with trusted content for low bandwidth requirements.

Many COTS systems can be quickly retrofitted with the DVG to gain increased security for interactive remote applications. The applications presented in this specification are representative of the increased security available for remote content delivery. The applications are immediately applicable to modern computing systems and the benefits can be widespread for securing the management of on-line personal sensitive information.

Extended applications of the DVG utilising multiple content streams, in-band security tagging, and the Digital Video Encryptor (DVE) are possible.

A trusted digital video communication method for operatively connecting a trusted server which serves trusted digital video data over an un-trusted digital network includes the following steps. Receiving at a digital video data input trusted digital video data from the trusted server and outputting data to the untrusted digital network at the digital communications port. Processing with a trusted digital processor operatively connected to the digital video data input and digital communications port, to encapsulate the trusted digital video data with a predefined file format and outputting the encapsulated trusted digital video data from the digital communications port over the un-trusted digital network.

Digital Data Guard

Figure 20:
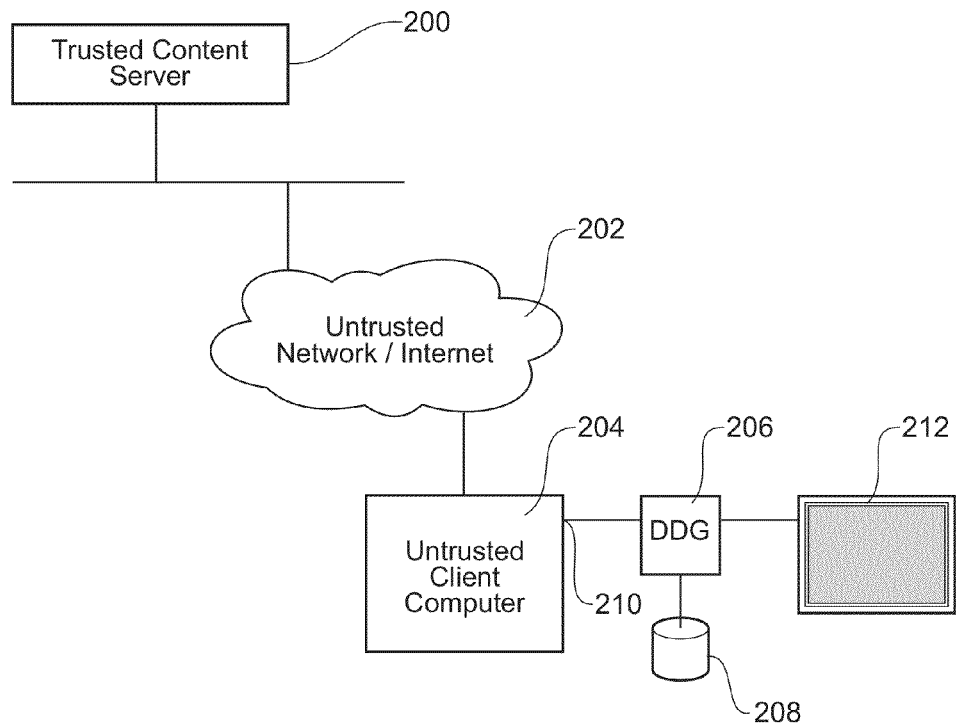
FIG. 20 depicts a complementary embodiment of the DVG, the Digital Data Guard (DDG) in an un-trusted network environment for delivering digital data to a digital data storage device attachable to the DDG.

A Digital Data Guard (DVG) 206 as depicted in FIG. 20 can be used to provide a facility for securely transferring content from a trusted content server 200 across an untrusted network 202 and via the use of an untrusted computer 204 onto a user's peripheral data storage device 208 such as a USB data storage device. Such a transfer can not be trusted when a user's peripheral data storage device is connected to a peripheral interconnect input of the untrusted computer, for example a USB data storage device connected to the USB port of the untrusted computer. The Digital Data Guard (DDG) is a security peripheral based on the Digital Video Guard that is plugged into the DVI output 210 of an untrusted client computer. Optionally, the DDG can be inserted in-line between the DVI output 210 of the untrusted client computer 204 and a DVI display 212 as per the operation of the DVG as depicted in FIG. 20.

Figure 21:
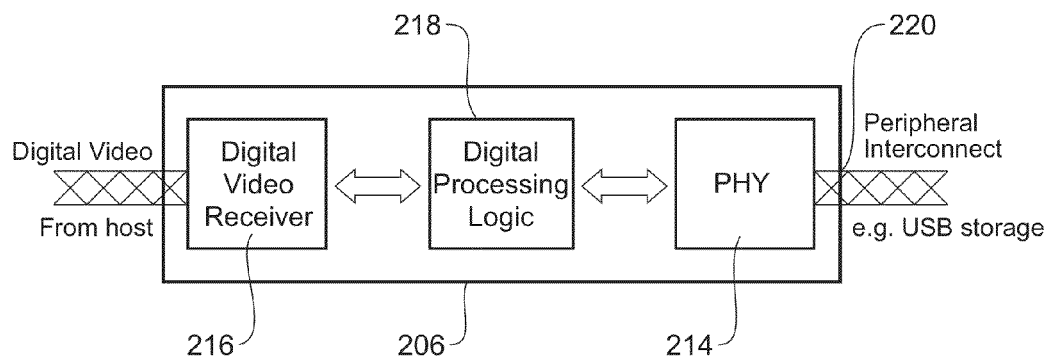
FIG. 21 depicts an embodiment of a generic hardware arrangement of the DDG.

As depicted in FIG. 21 the DDG 206 has a peripheral interconnect output 214, digital video receiver 216 and associated digital processing logic 218 such that, in an example, a peripheral interconnect port 220 allows the user to connect a removable storage device 208, such as a USB storage device to the DDG. An end-to-end encryption path can be setup between a trusted content server and the DDG through the use of the in-band digital video data content delivery method described in association with the DVG. In one example of a DDG application, the digital data whether encrypted or decrypted data is sent from the remote trusted content server and is stored directly onto the user's peripheral storage device. Such an application allows data needing secure transport over the intervening untrusted network to be sent form the trusted content server direct to the user's peripheral storage device. A user needing a copy of a classified document could securely receive the document, which could then be viewed on a suitably classified computer device without the classified computer device having to connect to the untrusted computer network. The data transported in this manner using a DDG could be any type of data including document, image, video, spreadsheet, encryption and decryption codes, software code, etc. Decryption or any further un-encapsulation or other such security related functions can be performed on the DDG or in the suitably classified computer device, as required.

A trusted digital data guarding method for connecting a source of encapsulated digital video data including within the encapsulated digital video data trustworthy data, to a peripheral data storage device, includes the following steps. Receiving encapsulated digital video data on a digital video data input and outputting data from at least one trusted peripheral interconnect output. Then processing with a trusted digital processor operatively connected to the digital video data input and at least one peripheral interconnect output, so as to un-encapsulate the digital video data to extract the trustworthy data and provide the trustworthy data to the peripheral device associated with the at least one peripheral interconnect output.

It will be appreciated by those skilled in the art that the invention is not restricted in its use to the particular application described. Neither is the present invention restricted in its preferred embodiment with regard to the particular elements and/or features described or depicted herein. It will be appreciated that various modifications can be made without departing from the principles of the invention. Therefore, the invention should be understood to include all such modifications within its scope.

The invention claimed is:

1. A trusted digital video guard for controlling the display of trustworthy and untrustworthy data on a digital video display device, including:
   a. a digital video data input for receiving untrustworthy digital data and in-band trustworthy digital data;
   b. a trusted digital video output for outputting digital video to the digital video display device;
   c. a trusted status indicator having a trusted indicator state; and
   d. a trusted digital processor operatively connected to the digital video data input, trusted digital video output and a trusted status indicator, and which processes digital data to identify untrustworthy digital data and to identify in-band trustworthy digital data and for directing,
      i. untrustworthy digital data to the trusted digital video output; or
      ii. trustworthy digital data and none or some modified untrustworthy digital data to the trusted digital video output, and controlling the status of the trusted status indicator to the trusted indicator state,
   wherein the trusted digital processor processes in-band signaling, in-band multiplexing, and tagging of data of received digital data.

2. The trusted digital video guard according to claim 1 wherein the trusted digital processor decrypts trustworthy encrypted digital data input.

3. The trusted digital video guard according to claim 1 wherein the trusted digital processor verifies digital signatures which encapsulate digital data input.

4. The trusted digital video guard according to claim 1 further including
   e. at least one peripheral interconnect input; and
   f. at least one peripheral interconnect output.

5. The trusted digital video guard according to claim 4 wherein data received by a peripheral interconnect input is encrypted as required by the trusted digital processor and output by a respective peripheral interconnect output.

6. The trusted digital video guard according to claim 4 further including at least two peripheral interconnect ports, wherein each ports includes and has the functionality of a peripheral interconnect input and a peripheral interconnect output.

7. The trusted digital video guard according to claim 4 wherein a remote computer device is connected to the trusted digital video guard through an untrusted connection and a human to computer interface device is connectable to at least one peripheral interconnect port of the trusted digital video guard and signal output from the human to computer interface device are provided to the other of the peripheral interconnect port pair of the trusted video guard for communication to the remote computer device.

8. The trusted digital video guard according to claim 7 wherein the trusted digital processor encrypts the signal output from the human to computer interface device.

9. The trusted digital video guard according to claim 7 wherein a signal output device is connectable to at least one peripheral interconnect port and signal output from the signal output device is processed by the trusted digital processor to become an in-band data signal provided to the other of the peripheral interconnect port pair for communication to the remote computer device.

10. The trusted digital video guard according to claim 1 wherein the trusted digital video output for outputting digital video to the video display device is digital video which substantially accords to the Digital Visual Interface Specification.

11. The trusted digital video guard according to claim 1 wherein the trusted digital processor and/or digital video data input and trusted digital video output, is a programmed Application Specific Integrated Circuit, Field Programmable Gate Array, micro-controller or digital logic device.

12. The trusted digital video guard according to claim 1 wherein the trusted digital processor further includes a digital data store including digital video data, and the trusted digital processor processes stored digital video data to generate in-band video content which is directed as trustworthy digital data.

13. The trusted digital video guard according to claim 1 wherein a trusted status indicator is a light emitting diode which is in the emitting state when there is a trusted indicator state.

14. The trusted digital video guard according to any preceding claim 1 further including
  g. a removable media reader wherein the key or keys for decryption are stored in removable media adapted to be read by the reader.

15. The trusted digital video guard according to claim 14 wherein the removable media encrypts and decrypts coded digital data input and the key or keys for encryption and decryption are stored in the removable media.

16. The trusted digital video guard according to claim 14 wherein the removable media is a smartcard.

17. A digital data security system for delivery of trustworthy video data from a trusted server to a video display device associated with a computer device over an untrusted digital data network, including
  a digital video device operatively connected to the trusted server that includes a digital processor for receiving trustworthy video content from the trusted server, encapsulating the trustworthy video content with a predetermined file format, transferring the encapsulated trustworthy video content over the untrusted digital network to the computer device associated with the video display device, and outputting the trustworthy video data by rendering in-band the trustworthy video along with none or some untrustworthy digital video data, and
  a digital video guard for controlling the display of trustworthy and untrustworthy data on the digital video display device including,
    a. digital video data input for receiving untrustworthy digital data and in-band trustworthy digital data from the computer device associated with the video display device;
    b. a trusted digital video output for outputting digital video to video display device;
    c. a trusted status indicator having a trusted indicator state; and
    d. a trusted digital processor operatively connected to the digital video data input, trusted digital video output and a trusted status indicator, said trusted digital processor un-encapsulates the trustworthy video content and identifies untrustworthy digital data and identifies in-band trustworthy digital data for directing
      i. untrustworthy digital data to the trusted digital video output; or
      ii. trustworthy digital data and none or some modified untrustworthy digital data to the trusted digital video output, and controlling the status of the trusted status indicator to the trusted indicator state.

18. The digital data security system according to claim 17 wherein the digital processor of the digital video device encrypts encapsulated trustworthy video content and the trusted digital processor of the digital video guard decrypts encapsulated trusted video content before processing in-band digital data.

19. The digital data security system according to claim 18 further including
  a removable media reader wherein the key or keys for decryption are stored in removable media adapted to be read by the reader.

20. The digital data security system according to claim 17 wherein the computer device associated with the video display device has at least one associated human to computer interface device which generates signal data, and wherein the digital video guard further includes,
  e. at least one peripheral interconnect input port operatively connected to at least one human to computer interface device; and
  f. at least one peripheral interconnect output port; wherein signal data, from the human to computer interface device which is received by a respective peripheral interconnect input, is encrypted as required by the trusted digital processor and output by a respective peripheral interconnect output port to the computer device and communicated over an untrusted digital data network, and wherein the digital processor of the digital video device decrypts received encrypted digital data generated by the human to computer interface device, and provides to the trusted server decrypted received digital data in a predetermined format representative of the signal data generated by the human to computer interface device wherein, human interaction with the displayed trustworthy video content is generated by the human to computer interface device and communicated to the trusted server over the untrusted digital data network.

21. The digital data security system according to claim 19 wherein the removable media reader further includes a trusted digital processor for encrypting and decrypting coded digital data input and the key or keys for encryption and decryption are stored in the removable media reader.

22. The digital data security system according to claim 21 wherein the removable media is a smartcard.

23. A digital data security method for delivery of trustworthy video data from a trusted server to a video display device associated with a computer device over an untrusted digital data network, including the steps of;
  a. processing in a digital video device operatively connected to the trusted server to receive trustworthy video content from the trusted server,
  b. encapsulating the trustworthy video content with a predetermined file format, c. transferring the encapsulated trustworthy video content over the untrusted digital data network to the computer device associated with the video display device and outputting the trustworthy digital data by rendering in-band the trustworthy digital data along with none or some untrustworthy digital video data, and d. processing in a digital video guard for controlling display of trustworthy and untrustworthy data on a digital video display device including the steps of;

e. receiving at digital video data input untrustworthy digital data and in-band trustworthy digital data;

f. processing with a trusted digital processor operatively connected to the digital video data input, a trusted digital video output and a trusted status indicator having a trusted indicator state, said trusted digital processor unencapsulates the trustworthy digital content and identifies untrustworthy digital display data and identifies in-band trustworthy digital data for directing,
  i. untrustworthy digital data to the trusted digital video output; or
  ii. trustworthy digital data and none or some modified untrustworthy digital display data to the trusted digital video output, and controlling the status of the trusted status indicator to the trusted indicator state; and g. outputting at the trusted digital video output digital video data to the video display device.

* * * * *

UNITED STATES PATENT AND TRADEMARK OFFICE
CERTIFICATE OF CORRECTION

PATENT NO.       : 8,572,403 B2
APPLICATION NO.  : 13/126444
DATED            : October 29, 2013
INVENTOR(S)      : Beaumont et al.

It is certified that error appears in the above-identified patent and that said Letters Patent is hereby corrected as shown below:

On the Title Page:

Page 1 (item 73, Assignee) at line 2, Change "Edinburgh (AT)" to --Edinburgh (AU)--.

In column 2 (page 1, item 56) at line 13, Under Other Publications, Change "02Out-of-band.pdf." to --Out-of-band.pdf.--.

In the Specification:

In column 6 at line 23, Change "steps of" to --steps of;--.

In column 6 at line 59, Change "steps of" to --steps of;--.

In column 7 at line 60, Change "depicts an a broad" to --depicts a broad--.

In the Claims:

In column 25 at line 20, In Claim 11, change "and/or" to --or--.

In column 25 at lines 34-35, In Claim 14, delete "any preceding".

Signed and Sealed this
Seventh Day of October, 2014

Michelle K. Lee
*Deputy Director of the United States Patent and Trademark Office*